(12) United States Patent
Qian et al.

(10) Patent No.: US 10,821,530 B2
(45) Date of Patent: Nov. 3, 2020

(54) OSCILLATING POWER TOOL

(71) Applicant: Positec Power Tools (Suzhou) Co., Ltd., Suzhou (CN)

(72) Inventors: Fu Qian, Suzhou (CN); Hongfeng Zhong, Suzhou (CN); Shisong Zhang, Suzhou (CN)

(73) Assignee: Positec Power Tools (Suzhou) Co., Ltd., Suzhou (CN)

(*) Notice: Subject to any disclaimer, the term of this patent is extended or adjusted under 35 U.S.C. 154(b) by 103 days.

(21) Appl. No.: 16/253,029

(22) Filed: Jan. 21, 2019

(65) Prior Publication Data
US 2019/0151969 A1    May 23, 2019

Related U.S. Application Data

(63) Continuation of application No. 15/167,262, filed on May 27, 2016, now Pat. No. 10,213,852, which is a
(Continued)

(30) Foreign Application Priority Data

Nov. 29, 2013 (CN) .......................... 2013 1 0629047
Jun. 18, 2014 (CN) .......................... 2014 1 0273956

(51) Int. Cl.
*B24B 23/02* (2006.01)
*B23D 51/16* (2006.01)
(Continued)

(52) U.S. Cl.
CPC .............. *B23D 51/16* (2013.01); *B24B 23/04* (2013.01); *B24B 27/08* (2013.01); *B24B 47/12* (2013.01);
(Continued)

(58) Field of Classification Search
CPC ....... B27B 19/00; B27B 19/02; B27B 19/006; B27B 19/008; B24B 23/00; B24B 23/04;
(Continued)

(56) References Cited

U.S. PATENT DOCUMENTS 5,637,034 A * 6/1997 Everts ..................... B24B 23/04
                                                                  451/162
5,681,213 A * 10/1997 Hashii ..................... B24B 23/04
                                                                  451/344
(Continued)

FOREIGN PATENT DOCUMENTS

CN      103302641 A    9/2013
EP      2594364 A1     5/2013
(Continued)

OTHER PUBLICATIONS

Translated International Search Report for International Patent Application No. PCT/CN2014/092377 dated Feb. 17, 2015, 2 pages.
(Continued)

*Primary Examiner* — Scott A Smith
(74) *Attorney, Agent, or Firm* — Dentons US LLP

(57) ABSTRACT

Disclosed is an oscillating power tool comprising: a housing; a motor; a drive shaft; an output shaft driven by the drive shaft to oscillate around its own axis at a certain angle of oscillation; an eccentric transmission mechanism converting the rotational movement of the drive shaft to the oscillation of the output shaft, wherein the eccentric transmission mechanism comprises an eccentric apparatus mounted on the drive shaft and a shift fork assembly respectively connected to the eccentric apparatus and the output shaft; and the eccentric apparatus comprises at least two drive members, the shift fork assembly comprises a first shift fork member and a second shift fork member, the first shift fork member has a first cooperating part cooperating with the
(Continued)

drive member and a second cooperating part cooperating with the second shift fork member, and the second shift fork member is connected to the output shaft. The oscillating power tool further comprises an adjusting mechanism placed on the housing, wherein the adjusting mechanism operably adjusts the movement of the first shift fork member, such that the first cooperating part abuts a different drive member, the second cooperating part abuts a different position of the second shift fork member, and the output shaft has a different angle of oscillation.

17 Claims, 27 Drawing Sheets

Related U.S. Application Data continuation of application No. PCT/CN2014/092377, filed on Nov. 27, 2014.

(51) Int. Cl.
    *B25F 5/00*     (2006.01)
    *B27B 19/00*     (2006.01)
    *B24B 23/04*     (2006.01)
    *B24B 27/08*     (2006.01)
    *B24B 47/12*     (2006.01)
    *B24B 47/16*     (2006.01)
    *B23Q 5/04*     (2006.01)
    *B23Q 5/027*     (2006.01)

(52) U.S. Cl.
    CPC .............. *B24B 47/16* (2013.01); *B25F 5/001* (2013.01); *B27B 19/006* (2013.01); *B23Q 5/027* (2013.01); *B23Q 5/04* (2013.01)

(58) Field of Classification Search
    CPC . B24B 27/08; B25F 5/00; B25F 5/001; B23D 51/16; B23Q 5/02; B23Q 5/027; B23Q 5/04
    USPC ...... 173/29, 47, 49, 213, 216, 217; 451/344, 451/356, 357, 449, 456; 30/272.1, 277.4, 30/392, 393
    See application file for complete search history.

(56) References Cited

U.S. PATENT DOCUMENTS

| | | | | |
|---|---|---|---|---|
| 5,919,085 | A * | 7/1999 | Izumisawa | B24B 23/04 451/357 |
| 5,993,304 | A * | 11/1999 | Eriksson | B23Q 5/027 451/356 |
| 6,569,002 | B2 * | 5/2003 | Smith | B24B 23/04 451/349 |
| 7,108,077 | B2 | 9/2006 | Zaiser | |
| 8,381,833 | B2 * | 2/2013 | Bernardi | B25B 28/00 173/162.1 |
| 8,757,285 | B2 * | 6/2014 | Weber | B24B 23/04 173/216 |
| 8,881,409 | B2 * | 11/2014 | Haman | B27B 19/006 30/392 |
| 9,821,430 | B2 * | 11/2017 | Zhang | B24B 23/04 |
| 10,213,852 | B2 * | 2/2019 | Qian | B24B 27/08 |
| 2003/0220058 | A1 * | 11/2003 | Pollak | B24B 47/10 451/357 |
| 2013/0213684 | A1 * | 8/2013 | Ikuta | A61B 17/142 173/213 |
| 2014/0020918 | A1 | 1/2014 | Klabunde | |
| 2014/0068952 | A1 * | 3/2014 | Soreo | B24B 27/08 30/369 |
| 2014/0123785 | A1 | 5/2014 | Sumi et al. | |

FOREIGN PATENT DOCUMENTS

| | | |
|---|---|---|
| WO | 2012041211 A1 | 4/2012 |
| WO | 2012145458 A2 | 10/2012 |
| WO | 2013109479 A1 | 7/2013 |

OTHER PUBLICATIONS

English language abstract, and machine-assisted English language translation of European Patent Publication No. EP 2594364 extracted from www.espacenet.com on Jan. 21, 2019, 17 pages.

English language abstract of International Patent Publication No. WO2012041211 extracted from www.espacenet.com on Jan. 21, 2019, 1 pages.

English language abstract, and machine-assisted English language translation of Chinese Patent Publication No. CN103302641 extracted from www.espacenet.com one Aug. 18, 2016, 14 pages.

* cited by examiner

OSCILLATING POWER TOOL

CROSS-REFERENCE TO RELATED APPLICATIONS

The present application is a continuation of U.S. application Ser. No. 15/167,262, filed May 27, 2016, now U.S. Pat. No. 10,213,852, which is a continuation of International Application No. PCT/CN2014/092377 filed on Nov. 27, 2014, which in-turn properly claims priority to Chinese Application No. CN201310629047.X filed on Nov. 29, 2013 and Chinese Application No. CN201410273956.9 filed on Jun. 18, 2014, the disclosures of which are hereby incorporated by reference.

FIELD OF THE INVENTION

The present invention relates to a power tool, in particular to a handheld oscillating power tool.

BACKGROUND OF THE INVENTION

A multi-function machine is a handheld oscillating power tool common in this field, and its working principle is that an output shaft makes oscillating movement about its own axis. Therefore, after a user installs different work heads on a free end of the output shaft, for example, a straight blade, a circular saw blade, a triangular grinded tray and a shovel-type scraper, many different operation functions can be achieved, for example, saw, cut, grind, scrape and so on, to adapt to different work demands.

Specifically, refer to FIG. 1 and FIG. 2, an oscillating power tool 100' includes a case 1', an output shaft 2' extending out of the case 1', a motor 11' disposed in the case 1' and a spindle 4' driven by the motor 11'. One end of the spindle 4' is connected with an eccentric shaft 41' offset to its axis Y, and the eccentric shaft 41' is mounted thereon with a bearing 8' having a spherical outer surface 81'. A fork 7' is disposed between the spindle 4' and the output shaft 2', one end of the fork 7' is pivotally connected to the output shaft 2', and a pair of arms 71' on two sides of the bearing 8' are formed on the other end. An axis X of the output shaft 2' is substantially perpendicular to the axis Y of the spindle 4', and the outer surface 81' of the bearing 8' closely touches the inner surfaces of the arms 71' of the fork 7'. When the spindle 4' rotates about its axis Y, through coordination between the bearing 8' and the fork 7', the output shaft 2' is driven to make oscillating movement about its own axis X within a certain oscillating angle, thereby driving a tool head 6' mounted on the output shaft 2' to oscillate.

When the above oscillating power tool 100' is working, the bearing 8' is driven by the eccentric shaft 41' to rotate around the axis Y of the spindle 4'. And axial movement of the fork 7' fastened on the output shaft 2' is limited, therefore, the output shaft 2' of the oscillating power tool 100' can only oscillating within a fixed oscillating angle range. During use, the user usually hopes that the oscillating power tool 100' can output different oscillating angles, to meet more working condition applications. For example, when the oscillating power tool 100' is used to install the straight blade on different-hardness wood materials to open a slot, if the wood materials have lower hardness, it is feasible that the output shaft 2' outputs a common small oscillating angle; when the wood materials have higher hardness, at a smaller oscillating angle, it is not easy to discharge sawdust, so that the straight blade is easy to get stuck, and at this point, the output shaft 2' is required to output a larger oscillating angle. Evidently, the oscillating power tool 100' cannot meet such a demand.

In the technical solution disclosed by the application in the patent application document with International Publication Number WO2012041211A1, the bearing is pushed through a toggle and a connecting rod to horizontally move along an eccentric shaft, to cause the fork to match the bearing in different positions, so that the output shaft has different oscillating angles. The position setting of the bearing in the technical solution is changeable, and when the fork and the bearing complete the matching and operate, the fork's producing reciprocating oscillating movement may bring about a reactive force to the bearing, to cause the bearing to be forced to be easy to move on the eccentric shaft, resulting in that limiting of the toggle and the connecting rod may cause failure with make the operation unstable.

Therefore, it is indeed necessary to provide an improved oscillating power tool, to solve the above problems.

SUMMARY OF THE INVENTION

In view of this, one objective of the present invention is to provide an improved oscillating power tool, wherein the oscillating power tool can operate at least two different oscillating angles, the structure is relatively stable, and the operation is not easy to fail.

To achieve the above objective, the solution of the invention is as below: an oscillating power tool, comprising: a housing; a motor contained in the housing; a drive shaft driven by the motor to output a rotary movement; an output shaft being configured to be drive by the drive shaft to oscillate about its own axis at a certain oscillating angle; and an eccentric transmission mechanism being configured to convert the rotary movement of the drive shaft to an oscillating movement of the output shaft, the eccentric transmission mechanism comprising an eccentric device mounted on the drive shaft and a fork assembly connecting the eccentric device with the output shaft; the eccentric device comprises at least two drive members, the fork assembly comprises a first fork member and a second fork member, the first fork member has a first mating portion being configured to mate with the drive member and a second mating portion being configured to mate with the second fork member, the second fork member connects the output shaft, the oscillating power tool further comprises an adjusting mechanism disposed in the housing, and the adjusting mechanism is operable to adjust the first fork member to move, so that the first mating portion abuts against different drive members, the second mating portion abuts against different parts of the second fork member, thus the output shaft is adjusted to output different oscillating angles.

Preferably, the drive members comprise a first drive member and a second drive member, in a first position, the first mating portion abuts against the first drive member and the output shaft has a first oscillating angle, and in a second position, the first mating portion abuts against the second drive member and the output shaft has a second oscillating angle.

Preferably, an eccentric distance from the first drive member to the drive shaft is greater than that from the second drive member to the drive shaft.

Preferably, the first fork member is pivotable between the first position and the second position.

Preferably, the eccentric device further comprises a first eccentric shaft and a second eccentric shaft connected with the drive shaft in sequence, and the first drive member is mounted on the first eccentric shaft, and the second drive member is mounted on the second eccentric shaft.

Preferably, the axis of the first eccentric shaft and the axis of the second eccentric shaft are located on the same side of the axis of the drive shaft.

Preferably, the first mating portion comprises a first matching surface for abutting against the first drive member and a second matching surface for abutting against the second drive member, and a radial distance from the first matching surface to the first eccentric shaft is greater than that from the second matching surface to the second eccentric shaft.

Preferably, the second fork member comprises a fork shaped arm, the fork shaped arm has an inner side surface extending in parallel along the axis of the drive shaft, and the inner side surface is for abutting against the second mating portion.

Preferably, the second mating portion comprises a third mating surface and a fourth mating surface, in the first position, the third mating surface abuts against the inner side surface, and in the second position, the fourth mating surface abuts against the inner side surface and the part where the third mating surface abuts against the inner side surface is different from the part where the fourth mating surface abuts against the inner side surface.

Preferably, radial distances from the third mating surface and the fourth mating surface to the drive shaft are the same.

Preferably, the eccentric transmission mechanism further comprises a retaining mechanism, and the retaining mechanism is selectively to keep the first fork member locating in the first position or the second position.

Preferably, the retaining mechanism comprises a first elastic member and a positioning member biased by the first elastic member, and the positioning member abuts against the first fork member in a direction tilted at a certain angle relative to the direction where the first elastic member is biased.

Preferably, the first fork member comprises a first V-shaped surface towards the positioning member, the positioning member comprises a second V-shaped surface towards the first fork member, when the first fork member is in the first position, one surface of the first V-shaped surface abuts against one surface of the second V-shaped surface; when the first fork member is in the second position, another surface of the first V-shaped surface abuts against another surface of the second V-shaped surface.

Preferably, the second fork member comprises an accommodating slot for accommodating the first elastic member, and the positioning member comprises a first positioning member and a second positioning member respectively abutting against two ends of the first elastic member.

Preferably, the first fork member is operable to pivot about a rotation shaft, and the rotation shaft is perpendicular to the axis of the drive shaft and the axis of the output shaft.

Preferably, the first fork member pivots about the rotation shaft relative to the second fork member.

Preferably, the first fork member comprises two intermediate arms disposed symmetrically, one end of each two intermediate arms are fixedly connected through a connecting structure, the rotation shaft is located on the connecting structure, and the first mating portion and the second mating portion are respectively disposed on anther ends of each two intermediate arms.

Preferably, the intermediate arms are located between the second fork member and the drive members, a side surface of the intermediate arms towards the drive member is provided with the first mating portion, and a side surface of the intermediate arms towards the second fork member is provided with the second mating portion.

Preferably, the adjusting mechanism comprises an operating unit movably coupling with the housing and a transfer unit movably connecting the operating unit with the first fork member, and the transfer unit converts a rotating operation of the operating unit to rotation of the first fork member between the first position and the second position.

Preferably, the operating unit comprises an operating member being configured to perform a rotating operation about an adjusting axis and a cam member connecting the operating member, the cam member has a cam structure with a gradual outline, and the cam structure is movable, so that the outline of the cam structure abuts against the transfer unit.

Preferably, the transfer unit comprises a waist hole for accommodating the cam structure and a transfer portion for abutting against the first fork member, and the cam structure drives the transfer portion abut against and drive the first fork member rotating when it rotates in the waist hole.

Preferably, the first fork member comprises a lug, the transfer portion and the lug have a gap there between, and the gap is eliminated with movement of the transfer portion.

Preferably, the first fork member rotates about a rotation shaft, and the rotation shaft is perpendicular to axial direction of the drive shaft and axial direction of the output shaft respectively and is parallel to the adjusting axis.

Preferably, a distance from the lug to the rotation shaft is less than that from the first drive portion to the rotation shaft.

Preferably, the adjusting mechanism further comprises a limit unit for limiting operations of the operating member, the limit unit comprises a limit member being configured to connect the operating member through a second elastic member and a limit slot for accommodating rotation of the limit member, the limit slot is provided with two limit projections protruding beyond the limit slot, the limit projections are respectively corresponding to the first position and the second position, and when the limit member rotates to the limit projections, the second elastic member biases the limit member into the limit projections.

Preferably, the housing is fixedly connected with a cover, the cover is provided with the limit slot, the limit slot is disposed in a curved manner, and two ends of the limit slot are respectively provided with the limit projections.

Preferably, the first fork member is movable between the first position and the second position along the axial direction of the drive shaft.

Preferably, the adjusting mechanism comprises an operating member disposed in the housing and a connecting member fixedly connecting the operating member with the first fork member, wherein the operating member is operable to move along the axial direction of the drive shaft and to make the first fork member linearly move between the first position and the second position through the connecting member.

Preferably, the connecting member is a pin shaft, one end of the pin shaft is fixedly coupled with the operating member, and another end of the pin shaft is coupled with the first fork member.

Preferably, the operating unit comprises an operating member disposed in the housing and a connecting member fixedly connecting the operating member and the first fork member, wherein the operating member is operable to rotate about a direction perpendicular to axial direction of the drive shaft and to make the first fork member linearly move between the first position and the second position through the connecting member.

Preferably, the connecting member comprises a cam, the operating member is fixedly connected with the center of the cam, and the outline of the cam abuts against the first fork member.

Preferably, the first fork member is movable between the first position and the second position along the axial direction of the output shaft.

Preferably, the first fork member comprises a first fork shaped arm and a first sleeve, a first matching portion for matching with the first drive member and a second matching portion for matching with the second drive member, the first matching portion and the second matching portion are disposed at an inner side surface of the first fork shaped arm respectively, and the first sleeve is movably coupled with the output shaft.

Preferably, planes where the first matching portion and the second matching portion located are parallel to each other, the first matching portion is away from the first sleeve, and the second matching portion is adjacent to the first sleeve.

Preferably, a distance from the center line of the first matching portion to the axis of the output shaft is greater than that from the center line of the second matching portion to the axis of the output shaft.

Preferably, the second fork member comprises a second sleeve fixedly connecting the output shaft, and a second fork shaped arm movably abutting against the first fork shaped arm.

Preferably, the adjusting mechanism comprises a control member disposed in the housing, a transmission portion fixedly connected with the control member, and a drive portion for matching with the transmission portion, and the drive portion is disposed at the first sleeve.

Preferably, the control member is an operating knob rotatably disposed at a head shell, the transmission portion comprises a transmission rod matching with the operating knob and a pulley connected with the transmission rod, and the drive portion is a recess disposed at the first sleeve and engaged with the pulley.

Preferably, the adjusting mechanism further comprises a locking mechanism for locking the fork assembly to the first position or the second position relative to the output shaft, the locking mechanism comprises a U-shaped opening disposed on the head shell and a pin fixedly connected between the operating knob and the transmission rod, and the pin is operated by the control member to move along a direction parallel to the axis of the output shaft in the opening and can clamp two end portions positioned to the transversal U-shaped opening respectively.

The present invention adopts the above technical solution, through an adjusting mechanism, a first fork member between a second fork member and a drive member is operably moved to different positions, making the second fork member mate with different drive members through the first fork member, so that the output shaft outputs different oscillating angles, to meet working demands in different occasions; the structure is relatively stable, and the operation is not easy to fail.

To achieve the above objective, another technical solution adopted by the present invention is: an oscillating power tool, comprising: a housing; a motor contained in the housing; a drive shaft driven by the motor to output a rotary movement; an output shaft contained in the housing, capable of oscillating about its own axis, and used for installing and driving work heads to work; and an eccentric transmission mechanism being configured to convert the rotary movement of the drive shaft to an oscillating movement of the output shaft, the eccentric transmission mechanism comprising an eccentric device and a fork assembly, the eccentric device being mounted on the drive shaft and eccentrically rotating about the axis of the drive shaft, and the fork assembly being connected between the output shaft and the eccentric device; wherein the eccentric device comprises at least two drive members, the fork assembly comprises an input portion for matching with the eccentric device and an output portion for matching with the output shaft, the oscillating power tool further comprises an adjusting mechanism disposed in the housing, and the adjusting mechanism operably controls the input portion to at least move between two positions along an axial direction of the output shaft, to cause the input portion to match different drive members, so that the output shaft has different oscillating angles.

Preferably, the drive member comprises a first drive member and a second drive member, the input portion moves between a first position and a second position along the axial direction of the output shaft, in the first position, the input portion matches the first drive member, to cause the output shaft to have a first oscillating angle; and in the second position, the input portion matches the second drive member, to cause the output shaft to have a second oscillating angle.

Preferably, the eccentric device comprises a first eccentric shaft and a second eccentric shaft connected with the drive shaft in sequence, the first drive member is connected to the first eccentric shaft, and the second drive member is connected to the second eccentric shaft Preferably, the first eccentric shaft and the second eccentric shaft are parallel to the drive shaft respectively, and the axis of the first eccentric shaft and the axis of the second eccentric shaft are located on the same side of the axis of the drive shaft.

Preferably, an eccentric distance between the first eccentric shaft and the drive shaft is greater than that between the second eccentric shaft and the drive shaft.

Preferably, the input portion is fixed with the output portion.

Preferably, the input portion is disposed as a fork shaped arm, an inner side surface of the fork shaped arm directly faces a first matching portion for matching with the first drive member and a second matching portion for matching with the second drive member respectively, and the output portion is disposed as a sleeve matching with the output shaft.

Preferably, planes where the first matching portion and the second matching portion located are parallel to each other, the first matching portion is away from the output portion, and the second matching portion is adjacent to the output portion.

Preferably, a distance from the center line of the first matching portion to the axis of the output shaft is greater than that from the center line of the second matching portion to the axis of the output shaft.

Preferably, the output portion is configured to couple with the output shaft.

Preferably, the adjusting mechanism comprises a control member movably connected to the housing, a transmission portion fixedly connected with the control member, and a drive portion movably matching with the transmission portion, and the drive portion is disposed at the output portion.

Preferably, the control member comprises a control knob rotatably disposed at a head shell and a lock knob for locking the control knob, the transmission portion comprises a cam member fixedly connecting the control member, a support arm driven and rotated by a cam, a rotating member driven and rotated by the support arm and a bearing, and the drive portion is a receiving slot disposed at the output portion and engaged with the bearing.

Preferably, the adjusting mechanism further comprises a locking mechanism for locking the fork assembly to the first position or the second position relative to the output shaft, and the locking mechanism comprises a cam portion disposed on one side of the cam member and an engage slot engaged with the cam portion.

Preferably, a gap elimination mechanism is disposed between the output portion and the output shaft, and the gap elimination mechanism is for reducing a circumferential oscillating gap of the output shaft.

Preferably, the gap elimination mechanism comprises a notch disposed at the output shaft and extending along the axis of the output shaft, and a key tooth fixedly connecting the output portion, the key tooth is engaged with the notch, the top end and the bottom end of the notch are respectively provided with a first conical surface, and the key tooth is provided with a second conical surface matching with the first conical surface.

The present invention adopts the above technical solution, through an adjusting mechanism, the fork is operable to move up and down along the axial direction of the output shaft to different positions, to cause the fork to mate with different drive members, so that the output shaft outputs different oscillating angles, to meet working demands in different occasions; the structure is relatively stable, and the operation is not easy to fail.

BRIEF DESCRIPTION OF THE DRAWINGS

The objective, technical solution and beneficial effects of the present invention described above can be clearly obtained through the following detailed description about specific embodiments that can implement the present invention and in combination with the description about the accompanying drawings.

DETAILED DESCRIPTION OF THE INVENTION

Preferred embodiments of the present invention are elaborated below with reference to the accompanying drawings, to enable advantages and features of the present invention to be understood by those skilled in the art more easily, thus making clearer definition to the protection scope of the present invention.

Embodiment 1

Figure 1:
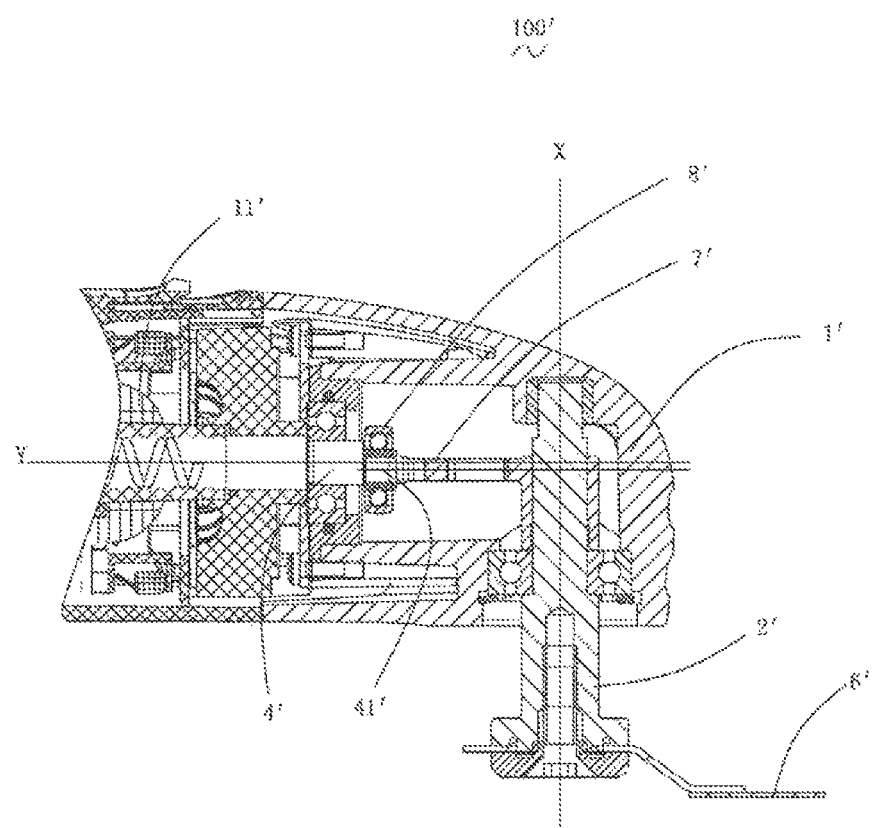
FIG. 1 is a sectional view of an existing oscillating power tool.
Figure 2:
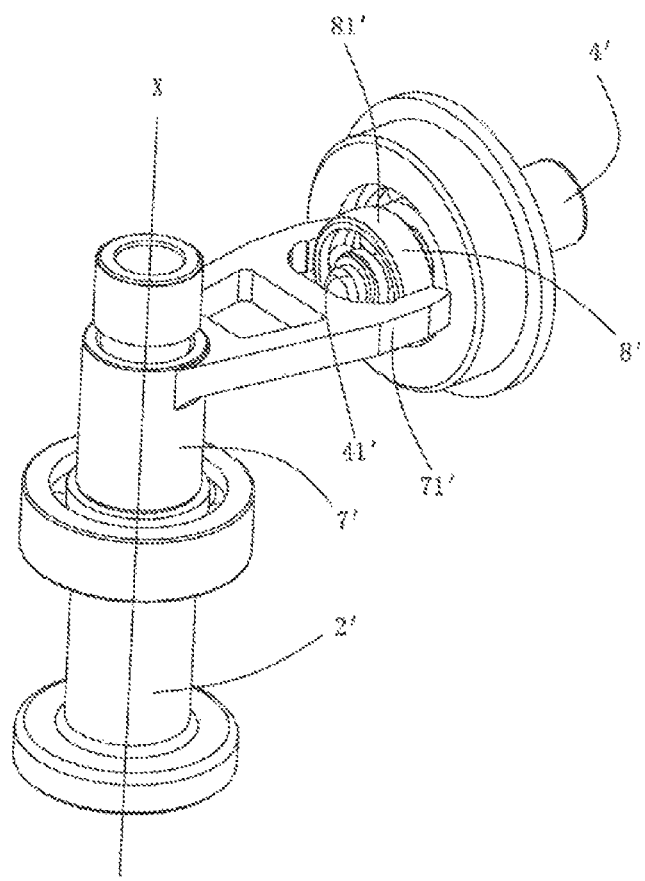
FIG. 2 is a partially structural view of the oscillating power tool as shown in FIG. 1.
Figure 3:
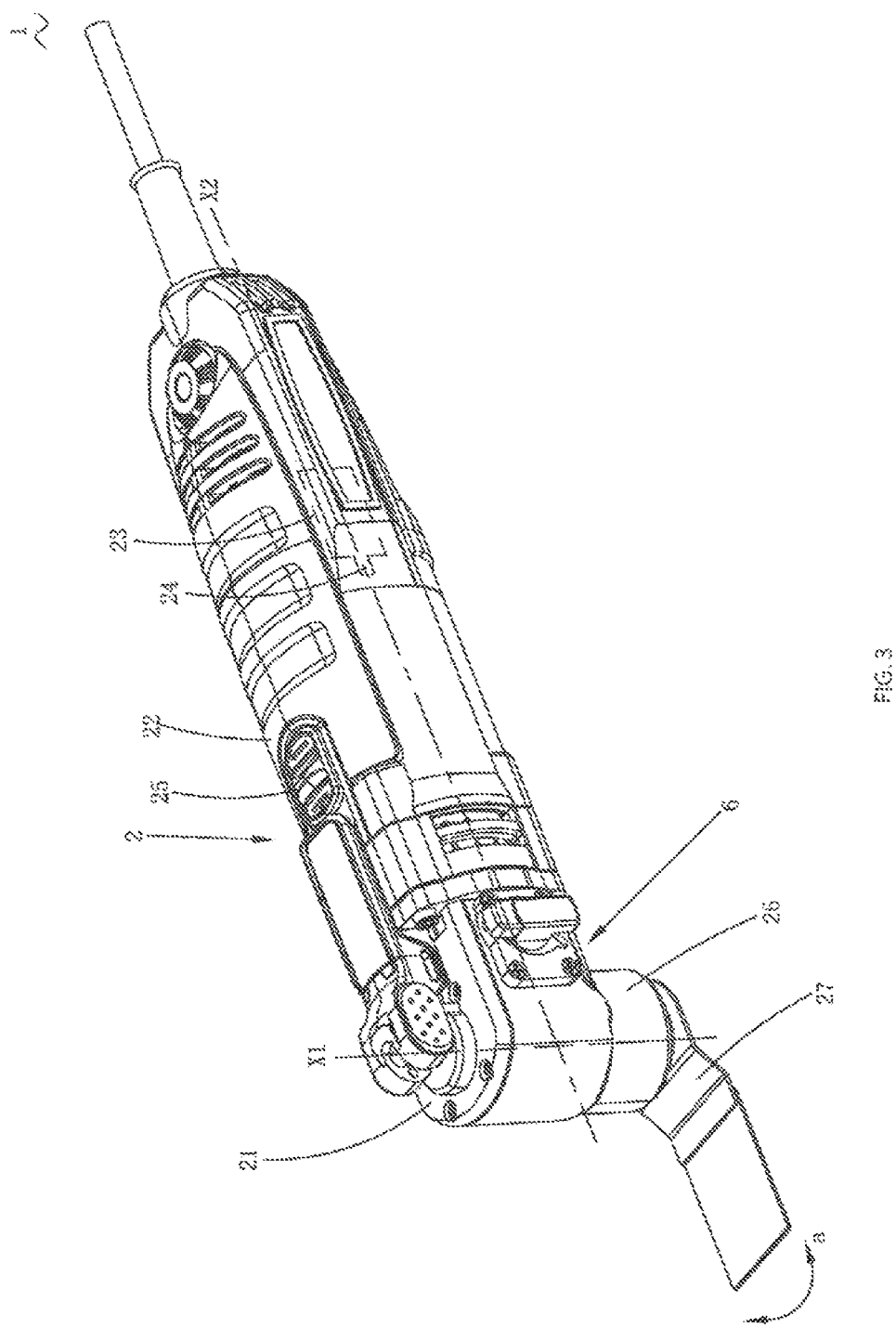
FIG. 3 is an overall view of an oscillating power tool in the first embodiment of the present invention.
Figure 4:
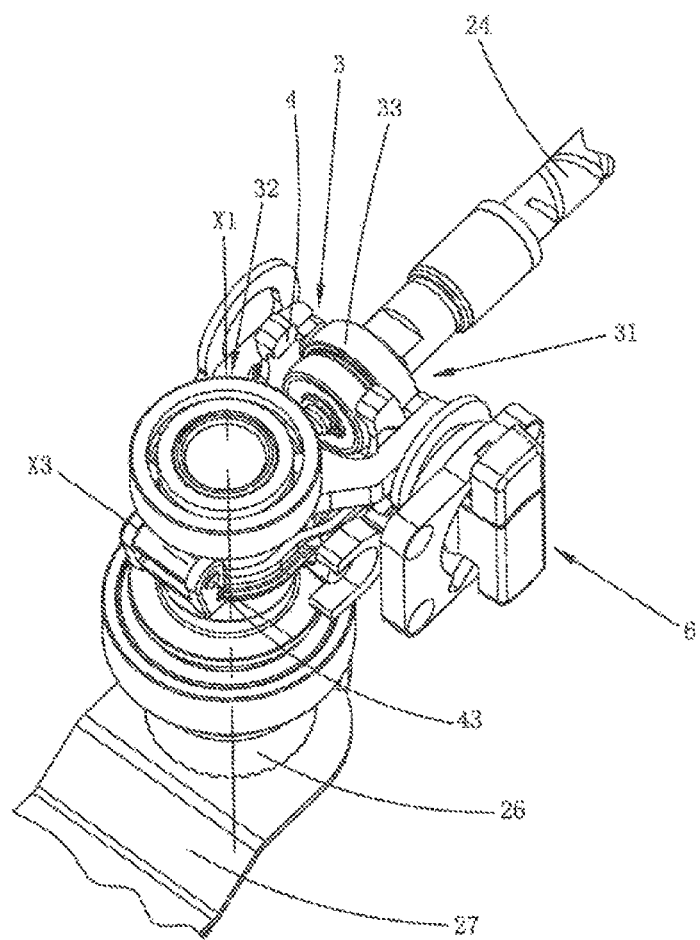
FIG. 4 is a view of the internal structure of the oscillating power tool as shown in FIG. 3, where the oscillating power tool is located at the first position.
Figure 5:
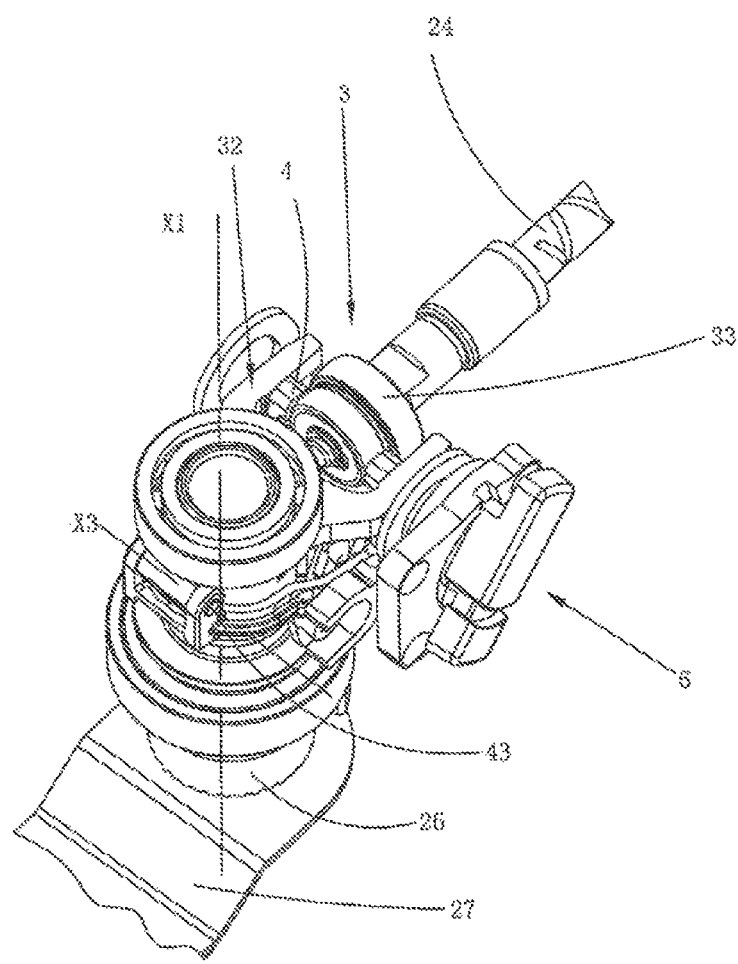
FIG. 5 is a view of the internal structure of the oscillating power tool as shown in FIG. 3, where the oscillating power tool is located at the second position.

As shown in FIG. 3 to FIG. 5, an oscillating power tool 1 has a housing 2 substantially extending along a direction. The housing 2 is defined to extend along a longitudinal direction. The housing 2 is divided into a front end and a rear end along the longitudinal direction, and the housing 2 includes a head shell 21 located at the front end and a case 22 located at the rear end. The case 22 is generally made of plastic, and the head shell 21 is generally made of metal. The case 22 and the head shell 21 are fixedly connected integrally through a screw. A motor 23 is contained in the case 22. A drive shaft 24 is mounted on the motor 23. An axis X2 of the drive shaft 24 also extends along the longitudinal direction. The motor 23 drives the drive shaft 24 to output a rotary movement about its axis. In addition, the case 22 is provided thereon with a switch 25 that controls turn-on or turn-off of the motor 23. An output shaft 26 is disposed in the head shell 21 along a vertical direction. An axis X1 of the output shaft 26 is substantially perpendicular to the axis X2 of the drive shaft. The output shaft 26 can make oscillating movement about its own axis X1 at a certain oscillating angle, and the oscillating direction is as shown by the double-headed arrow a shown in FIG. 3. One end of the output shaft 26 detachably matches a work head 27.

As shown in FIG. 4, an eccentric transmission mechanism 3 is further disposed inside the housing 2. The eccentric transmission mechanism 3 is located between the drive shaft 24 and the output shaft 26, with a function of converting the rotational movement of the drive shaft 24 to an oscillating movement of the output shaft 26. The eccentric transmission mechanism 3 comprises an eccentric device 31 and a fork assembly. The eccentric device 31 is mounted on the drive shaft 24, and the fork assembly is mounted on the output shaft 26. The eccentric device 31 and the fork assembly are connected with each other. In this embodiment, the fork assembly includes a first fork member 4 and a second fork member 32. The first fork member 4 connects the eccentric device 31 with the second fork member 32 together.

The eccentric device 31 includes at least two drive members 33. The drive members 33 can be mounted on the drive shaft 24 without relative rotation, so as to output a rotary movement along with the rotational movement of the drive shaft 24. The multiple drive members 33 are arranged along the direction of the axis X2 of the drive shaft 24 in sequence. Moreover, in a preferred embodiment, they are spaced apart at a certain gap. The drive members 33 can have many specific forms. In this embodiment, the drive members 33 are ball bearings common in the industry. The ball bearings have a radius with a fixed size. The multiple drive members 33 have a radius with the same size, and may also have a radius with a different size. In addition, the drive member 33 of the present invention can be freely selected to have a certain eccentric distance or not to have an eccentric distance relative to the drive shaft 24. In an embodiment of having a certain eccentric distance, the multiple drive members 33 may have an eccentric distance with the same size, and may also have an eccentric distance with different sizes respectively.

Figure 6:
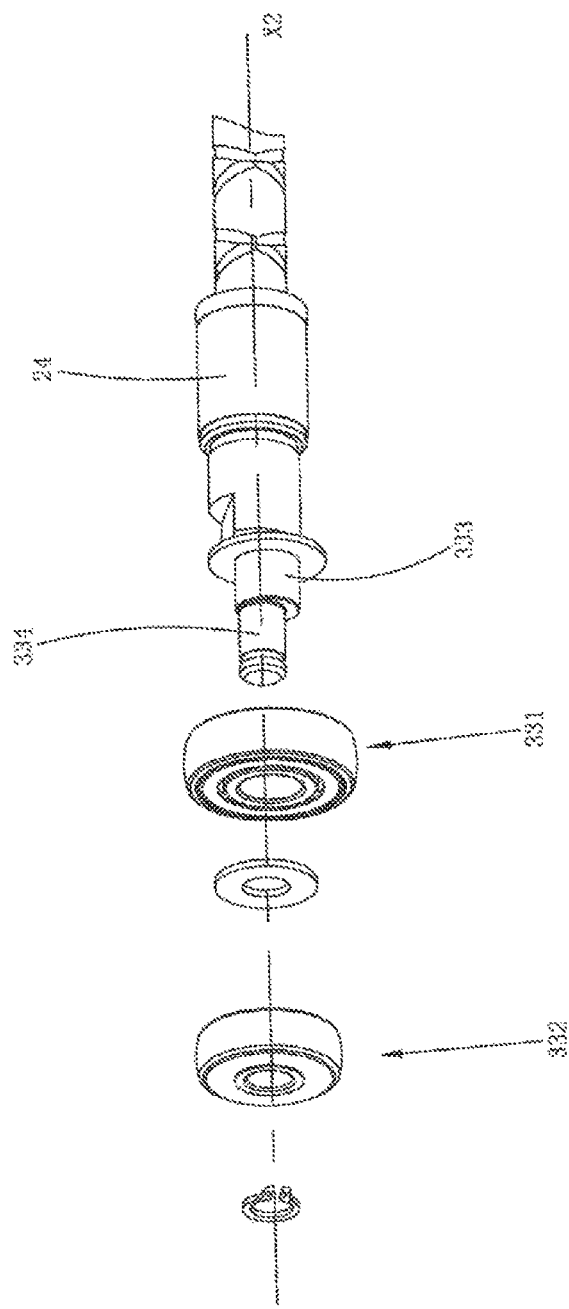
FIG. 6 is an exploded view of the eccentric device of the oscillating power tool as shown in FIG. 3.

In an embodiment as shown in FIG. 6, at least two drive members 33 includes a first drive member 331 and a second drive member 332, wherein the first drive member 331 is adjacent to the motor 23 or away from the output shaft 26. The second drive member 332 is away from the motor 23 or adjacent to the output shaft 26. The eccentric device 31 further includes a first eccentric shaft 333 and a second eccentric shaft 334 fixedly connecting the drive shaft 24. The first eccentric shaft 333 and the second eccentric shaft 334 are axially connected with the drive shaft 24 in sequence. That is, one end of the first eccentric shaft 333 connects the drive shaft 24, and the other end thereof connects the second eccentric shaft 334. The first eccentric shaft 333 is offset to one side of the axis X2 of the drive shaft, the second eccentric shaft 334 is offset to the same side of the axis X2 of the drive shaft, and axes of a first eccentric shaft 142 and a second eccentric shaft 143 are parallel to the axis X2 of the drive shaft respectively. In addition, eccentric distances of the first eccentric shaft 333 and the second eccentric shaft 334 are not the same. Specifically, the eccentric distance of the first eccentric shaft 333 is less than that of the second eccentric shaft 334. The first drive member 331 is mounted on the first eccentric shaft 333 without relative movement, and the second drive member 332 is mounted on the second eccentric shaft 334 without relative movement. Therefore, an eccentric distance from the first drive member 331 to the drive shaft 23 is less than that from the second drive member 332 to the drive shaft 23. The first drive member 331 and the second drive member 332 are disposed in parallel along a direction perpendicular to the axis X2 of the drive shaft.

Figure 7:
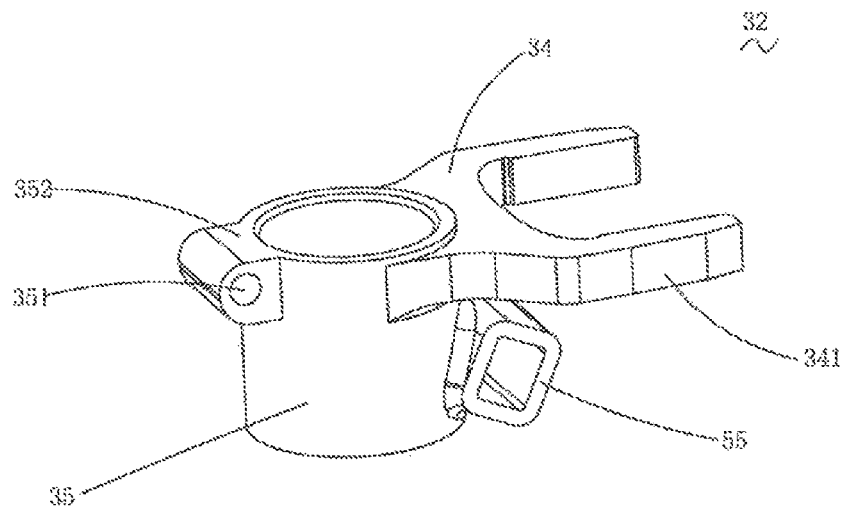
FIG. 7 is an overall view of the fork assembly of the oscillating power tool as shown in FIG. 3.

The second fork member 32 is as shown in FIG. 7. The second fork member 32 is for connecting the eccentric device 31 with the output shaft 26 respectively. The second fork member 32 mainly includes a fork portion 34. The fork portion 34 is a common structure in this technical field. The fork portion 34 includes two forked fork arms 341, disposed substantially in a U shape, and the two fork arms 341 are parallel to each other. The fork arms 341 surround a radial outer side of the drive member 33, so that an inner side surface of the fork arms 341 contacts and connects an outer surface of the drive member 33. Definitely, in the present invention, the fork arms 341 do not directly abut against the drive member 33, but achieve a connection relationship through another element. In addition, the second fork member 32 further includes a socket portion 35 socketed with the output shaft 26. The socket portion 35 is a hollow cylindrical structure, and its extending direction is consistent with the direction of the axis X1 of the output shaft. The socket portion 35 may be integrally formed with the fork portion 34.

Figure 8:
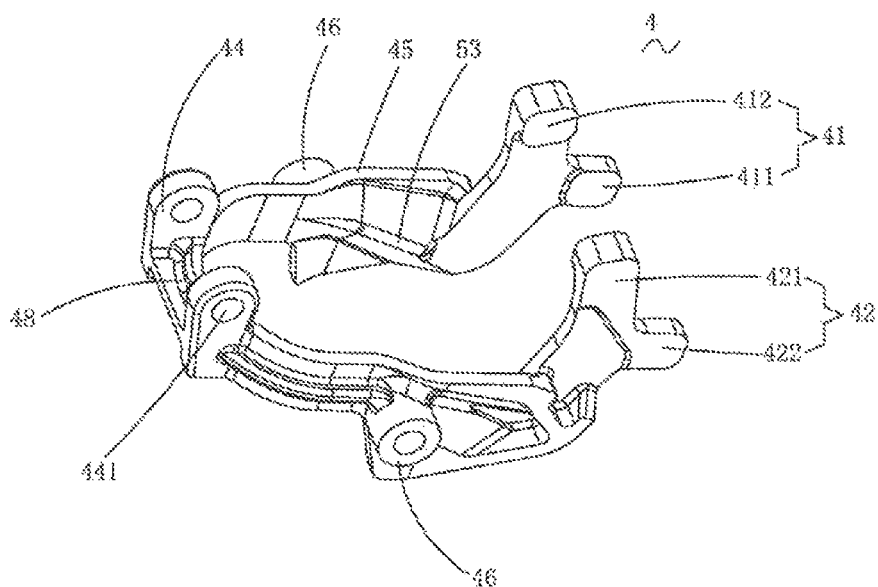
FIG. 8 is an overall view of the second fork of the oscillating power tool as shown in FIG. 3.
Figure 9:
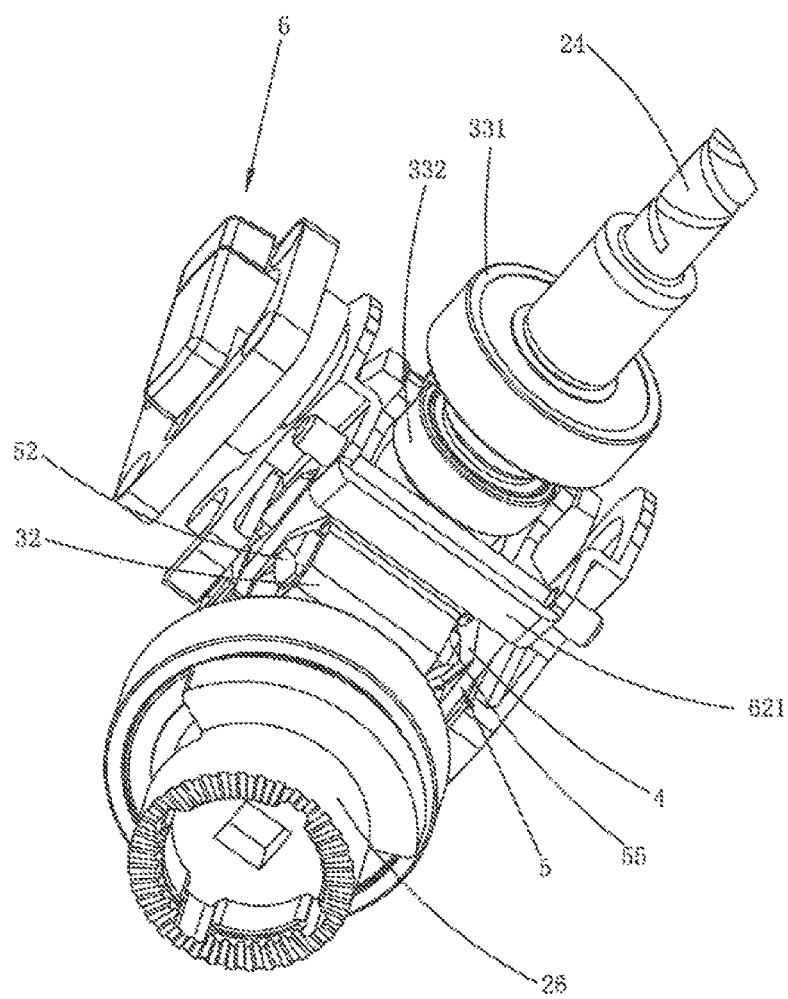
FIG. 9 is an overall view of the retaining mechanism of the oscillating power tool as shown in FIG. 3.
Figure 10:
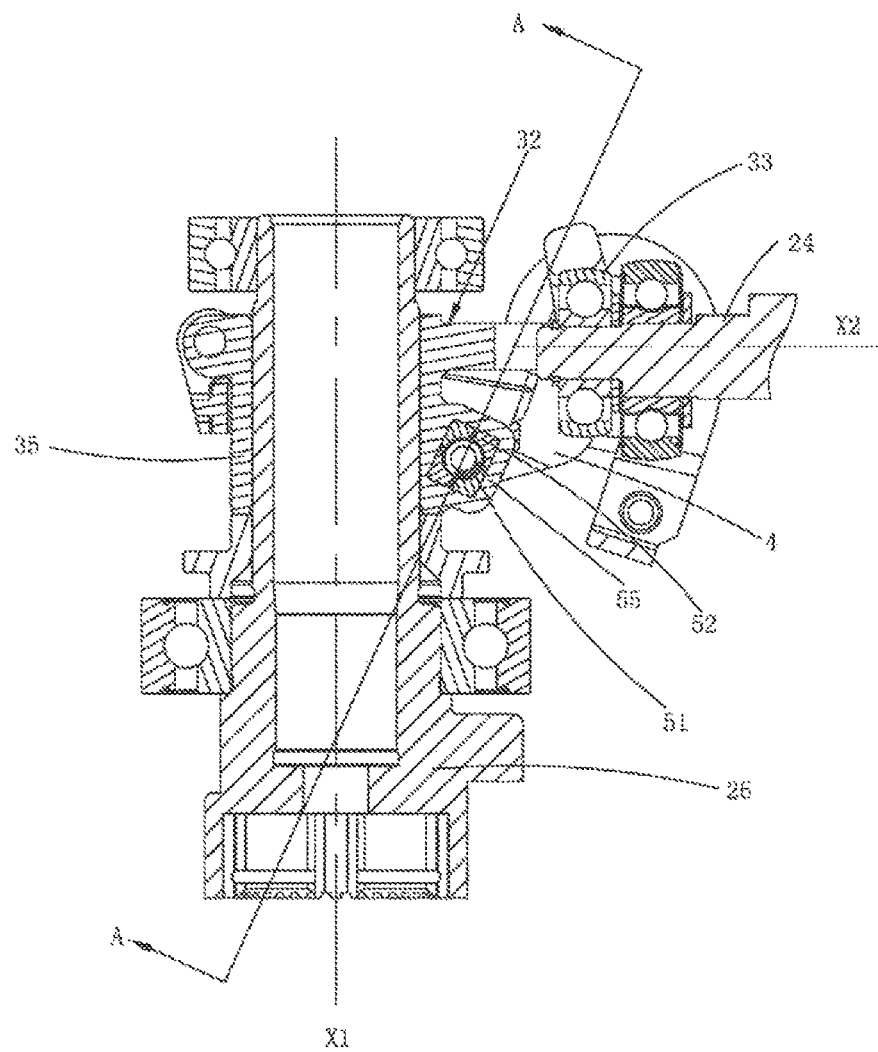
FIG. 10 is a sectional view of the internal structure of the oscillating power tool as shown in FIG. 3.
Figure 11:
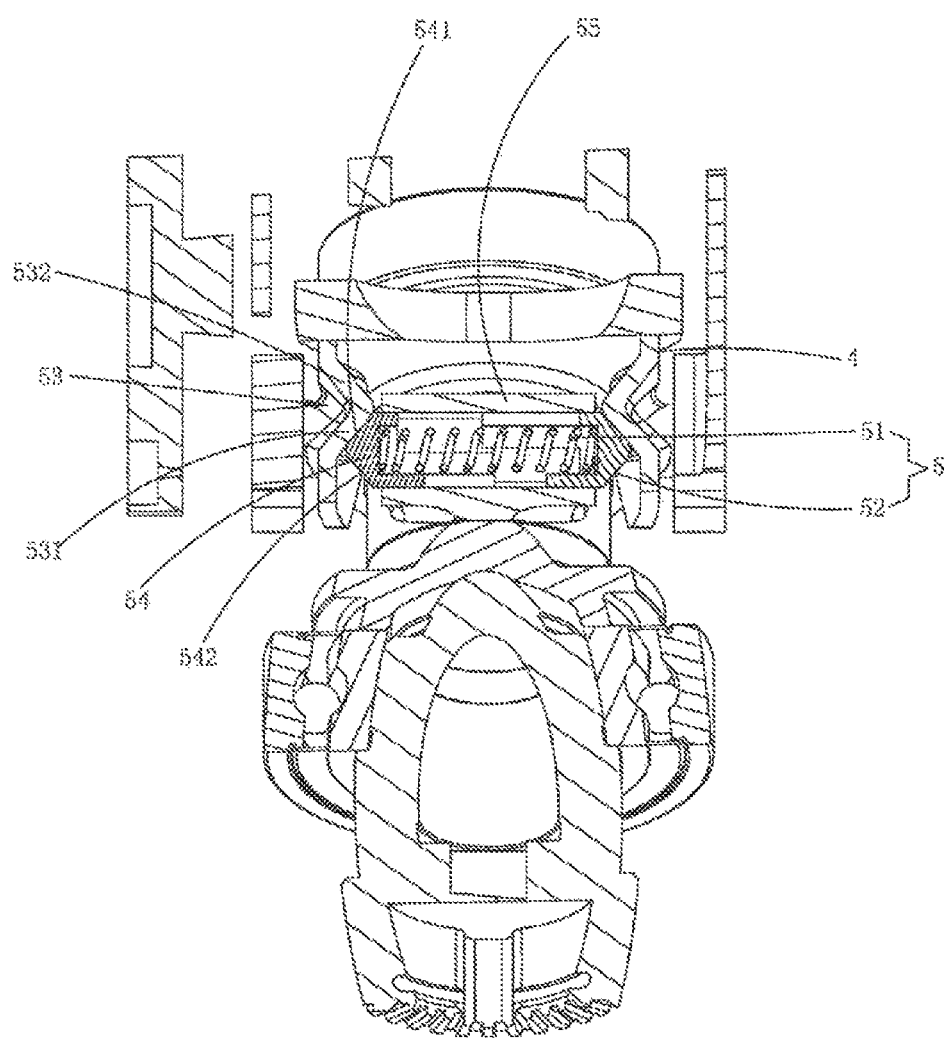
FIG. 11 is a sectional view taken along line A-A of the retaining mechanism as shown in FIG. 10.

In the present invention, the fork assembly further includes a first fork member 4 located between the eccentric device 31 and the second fork member 32. As shown in FIG. 8, the first fork member 4 has a first mating portion 41 being configured to mate with the drive member 33 and a second mating portion 42 being configured to mate with the second fork member 32. The first fork member 4 is operable to move, so that the first mating portion 41 abuts against different drive members 33, and the second mating portion 42 abuts against different positions of the second fork member 32. Owing to mate with different positions, the amplitude at which the drive members 33 drive the second fork member 32 to move through the first fork member 4 is different, so that the output shaft 26 has different oscillating angles. Furthermore, the first fork member 4 has a first position as shown in FIG. 4 and a second position as shown in FIG. 5. The first fork member 4 is movable back and forth between the first position and the second position. The first position corresponds to the position where the output shaft 26 outputs a greater oscillating angle, and the second position corresponds to the position where the output shaft 26 outputs a smaller oscillating angle. So, the oscillating power tool 1 has at least two different operating modes.

In this embodiment, the first fork member 4 moves in a manner of rotating about a rotation shaft 43. An axis X3 of the rotation shaft 43 is disposed to extend along the direction perpendicular to the axis X1 of the output shaft and the axis X2 of the drive shaft. As shown in FIG. 8, the first fork member 4 is provided thereon with a first boss 44, and the first boss 44 has a first perforation 441 for accommodating the rotation shaft 43 to pass through. As shown in FIG. 7, the second fork member 32 is provided thereon with a second perforation 351 for accommodating the rotation shaft 43 to pass through. Further, the socket portion 35 of the second fork member 32 is provided thereon with a second boss 352, and the second perforation 351 is located on the second boss 352. The rotation shaft 43 may be a pin shaft. After the first perforation 441 and the second perforation 351 are mounted and aligned, the pin shaft passes through the first perforation 441 and the second perforation 351 in sequence. The first fork member 4 may pivot about the rotation shaft 43 relative to the second fork member 32. After the first fork member 4 moves, the first mating portion 41 may selectively abut against the first drive member 331 or the second drive member 332, and the second mating portion 42 may selectively abut against different positions of the fork arm 341 of the second fork member 32.

As shown in FIG. 4 to FIG. 8, the first mating portion 41 abuts against the drive member 33 by means of surface contact. The first mating portion 41 includes a first matching surface 411 for abutting against the first drive member 331 and a second matching surface 412 for abutting against the second drive member 332. In this embodiment, as the first drive member 331 and the second drive member 332 have different radii, in order to be able to abut against a radial side surface of the first drive member 331 or the second drive member 332, a radial distance from the first matching surface 411 to the first eccentric shaft 333 is different from a radial distance from the second matching surface 412 to the second eccentric shaft 334. The radial distance of the first matching surface 411 is smaller. In other words, the first matching surface 411 and the second matching surface 412 are not coplanar. Definitely, in other embodiments, the first matching surface 411 may also be coplanar with the second matching surface 412. In addition, the first fork member 4 is substantially in a U-shaped structure and has two intermediate arms 45. The intermediate arms 45 are located between the second fork member 32 and the drive member 33. The two intermediate arms 45 are substantially parallel, one end thereof serves as a connecting end to be connected through a connecting structure 48, and the other end is a free end. The first boss 44 and the rotation shaft 43 are disposed on the connecting structure 48 of the intermediate arms 45. The first mating portion 41 is disposed at the free end of the intermediate arms 45. The free end of the intermediate arms 45 is a forked structure and has two branches, the first matching surface 411 is located on one branch therein, and the second matching surface 412 is located on the other branch. After installation, when the first fork member 4 moves to the first position, the first matching surface 411 mates with the first drive member 331, and thus is much closer to the drive shaft 24. When the first fork member 4 moves to the second position, the second matching surface 412 mates with the second drive member 332, and thus is further from the drive shaft 24.

As shown in FIG. 4 to FIG. 8, the second mating portion 42 abuts against the second fork member 32 by means of surface contact. The second mating portion 42 includes a third matching surface 421 and a fourth matching surface 422. In this embodiment, the third matching surface 421 and the fourth matching surface 422 abut against different positions of inner side surfaces of the fork arms 341 respectively. The fork arms 341 extend in parallel along the axis X2 of the drive shaft 24, and thus the inner side surfaces of the two fork arms 341 thereof are also parallel to each other; therefore, the third matching surface 421 and the fourth matching surface 422 are coplanar. Therefore, radial distances from the third matching surface 421 and the fourth matching surface 422 to the drive shaft 24 are the same. The second mating portion 42 is also located at the free end of the intermediate arms 45. The first mating portion 41 is disposed on a side surface of the intermediate arms 45 towards the drive member 33, and the second mating portion 42 is disposed on a side surface of the intermediate arms 45 towards the fork assembly 32. The third matching surface 421 is disposed opposite the first matching surface 411, and the fourth matching surface 422 is disposed opposite the second matching surface 412. That is to say, the third matching surface 421 is much closer to the drive shaft 24, and the fourth matching surface 422 is further from the drive shaft 24. When the first fork member 4 moves to the first position, the first matching surface 411 of the first fork member 4 abuts against the first drive member 331, and the third matching surface 421 abuts against the inner side surfaces of the fork arms 341; at this point, the second mating surface 412 and the fourth mating surface 422 are in a free state, and do not abut against any surface; when the first fork member 4 moves to the second position, the second matching surface 412 of the first fork member 4 abuts against the second drive member 332, and the fourth matching surface 422 abuts against the inner side surfaces of the fork arms 341; at this point, the first matching surface 411 and the third matching surface 421 are in a free state, and do not abut against any surface. The position when the third matching surface 421 abuts against the inner side surfaces of the fork arms 341 is different from the position when the fourth matching surface 422 abuts against the inner side surfaces.

As shown in FIG. 7 to FIG. 11, the eccentric transmission mechanism 3 further includes a retaining mechanism 5. The function of the retaining mechanism 5 is to retain the first fork member 4 to a current position. In this embodiment, when the first fork member 4 moves to the first position or the second position, the retaining mechanism 5 can make the first fork member 4 stably kept at the first position or the second position, which prevents the first fork member 4 from leaving the first position or the second position during operation due to accidental vibration. The retaining mechanism 5 is located between the second fork member 32 and the first fork member 4. The retaining mechanism 5 includes a first elastic member 51 and a positioning member 52. The positioning member 52 is biased by the first elastic member 51 to abut against the first fork member 4, so as to play a role of positioning and retaining the first fork member 4. When it is necessary to release the positioning and retaining role to make the first fork member 4 move actively, a user only needs to overcome the biasing effect of the first elastic member 51. In order to make the positioning and retaining role of the first elastic member 51 enough reliable, the acting force that releases the positioning and retaining role is required not to be too large to avoid affecting operational experience, therefore, the positioning member 52 abuts against the first fork member 4 in a direction tilted at a certain angle with the biasing direction of the first elastic member 51. The first fork member 4 includes a first V-shaped structure 53 disposed towards the positioning member 52. The first V-shaped structure 53 is located on the intermediate arms 45 of the first fork member 4. The first V-shaped structure 53 protrudes towards an inner side relative to surfaces of the intermediate arms 45. The first V-shaped structure 53 includes a first slope 531 and a second slope 532 disposed opposite to each other, and the first slope 531 and the second slope 532 form a V shape. A second V-shaped structure 54 is disposed on a corresponding position on the positioning member 52. The second V-shaped structure 54 protrudes towards the first fork member 4, so that the first V-shaped structure 53 and the second V-shaped structure 54 protrude oppositely. The second V-shaped structure 54 also has a third slope 541 and a fourth slope 542 that form a V shape. The first slope 531 can only abut against the third slope 541, and the second slope 532 can only abut against the fourth slope 542. When the first fork member 4 is in the first position, the first elastic member 51 biases the third slope 541 to abut against the first slope 531, and at this point, abutment of the two slopes can play a role of retaining at the first position. When the first fork member 4 is moved to the second position, the user overcomes the biasing force of the first elastic member 51 to make the first slope 531 and the third slope 541 produce relative sliding, until the movement is beyond the vertices of the slopes. Then, the second slope 532 begins to abut against the fourth slope 542. At this point, the biasing force of the first elastic member 51 pushes the second slope 532 to move relative to the fourth slope 542, and moves towards the bottom of the slope. After the first fork member 4 is in the second position, the second slope 532 abuts against the fourth slope 542. In this embodiment, the number of the first V-shaped structure 53 is two, which are symmetrically located on the intermediate arms 45 respectively. The number of the second V-shaped structure 54 of the positioning member 52 is also two. The first elastic member 51 is located between the two V-shaped structures 54, and two ends of the first elastic member 51 abut against the second V-shaped structures 54 respectively. In addition, the second fork member 32 further includes an accommodating slot 55 for accommodating the first elastic member 51. The accommodating slot 55 is located on one side of the socket portion 35 of the second fork member 32 and is fixedly connected with the socket portion 35. Preferably, the socket portion 35 and the accommodating slot 55 are integrally formed. The accommodating slot 55 is a through channel. The first elastic member 51 is located in the channel.

Figure 12:
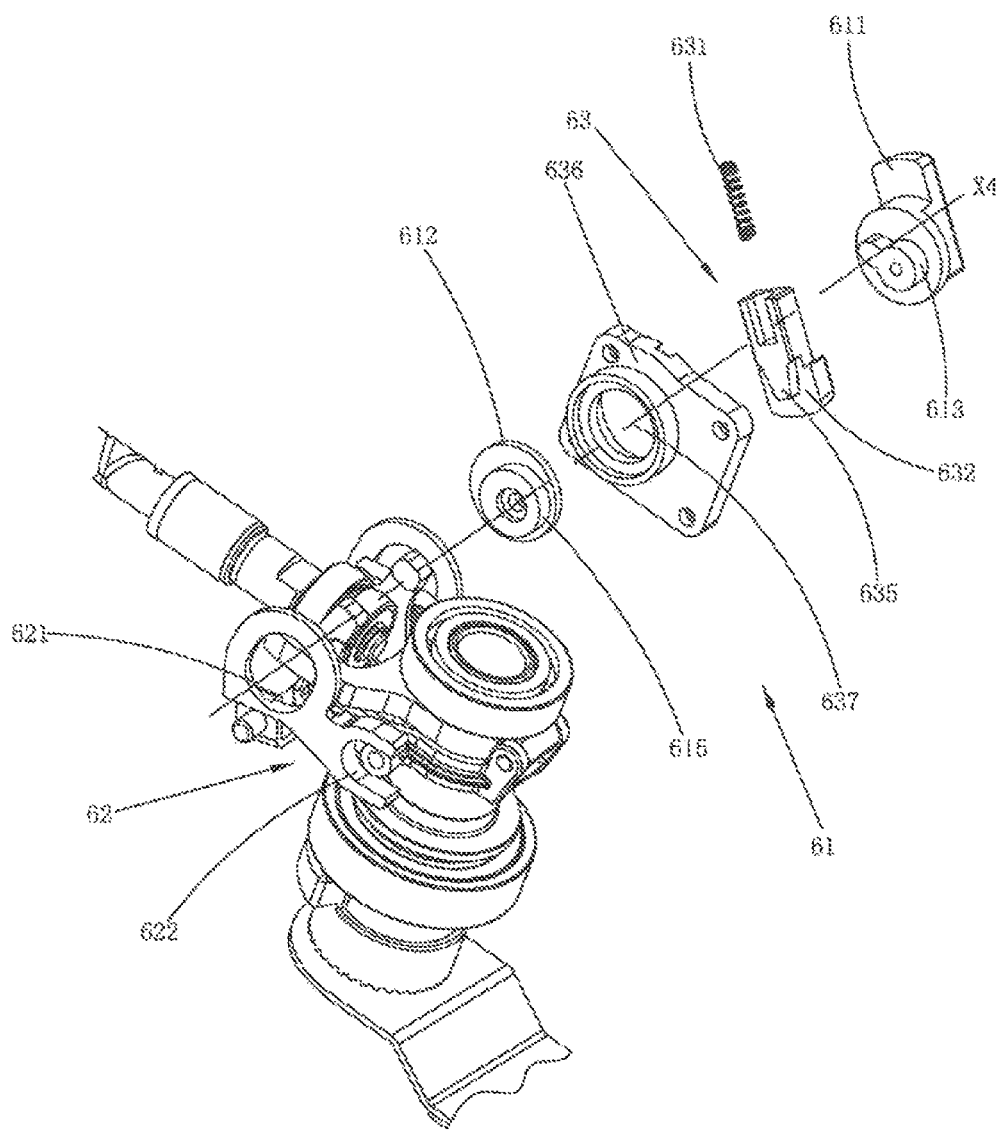
FIG. 12 is an exploded view of the adjusting mechanism of the oscillating power tool as shown in FIG. 3 along an angle.
Figure 13:
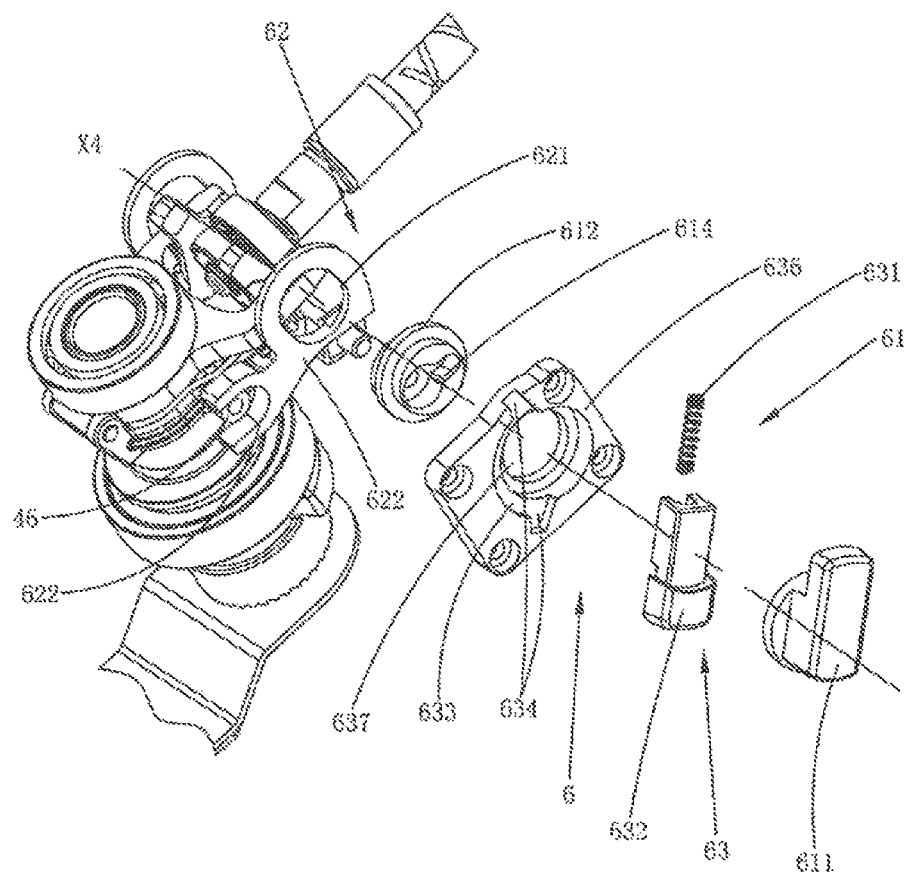
FIG. 13 is an exploded view of the adjusting mechanism of the oscillating power tool as shown in FIG. 3 along another angle.

As shown in FIG. 12 and FIG. 13, the oscillating power tool 1 further has an adjusting mechanism 6 is operable to move first fork member 4. The adjusting mechanism 6 is disposed in the housing 2, to facilitate the user to operate and regulate it. Preferably, the adjusting mechanism 6 is disposed on the head shell 21, to make it convenient to control the first fork member 4. There may be two adjusting mechanisms 6, which are disposed on two sides of the first fork member 4. There may also be only one adjusting mechanism 6, which is disposed on one side of the first fork member 4. The adjusting mechanism 6 is rotated and regulated about its adjusting axis X4. In this embodiment, the adjusting axis X4 and the axis X3 of the rotation shaft are disposed in parallel, but are not coaxial, and are a certain distance apart. The adjusting mechanism 6 includes an operating unit 61 movably coupling with the housing 2 and a transfer unit 62 movably connecting the operating unit 61 with the first fork member 4, the operating unit 61 is for rotating and operating about the adjusting axis X4, and the transfer unit 62 is for converting rotating operation of the operating unit 61 to rotation of the first fork member 4 between the first position and the second position. The operating unit 61 includes an operating member 611 directly operated by the user and a cam member 612 matching with the operating member 611. The shapes of the operating member 611 and the cam member 612 match to cause that the operating member 611 and the cam member 612 have no relative movement there between. The operating member 611 has a convex first shape 613, and the cam member 612 has a concave second shape 614. The first shape 613 and the second shape 614 form shape-fit, so that the rotating operation of the operating member 611 drives the cam member 612 to rotate together. In other embodiments, the first shape 613 may also be designed concavely, and the second shape 614 is designed convexly. The first shape 613 and the second shape 614 may be in irregular shapes, a regular shape (e.g., square, trapezoid) or a combination of the regular shapes. The cam member 612, in addition to having the second shape 614, also has a cam structure 615 with a gradual outline. The outline of the cam structure 615 is for connecting the transfer unit 62. The center of the cam structure 615 is located on the adjusting axis X4. The transfer unit 61 includes a waist hole 621 being configured to mate with the cam structure 615 and a transfer portion 622 used for abutting against the second fork member 32. The waist hole 621 and the transfer portion 622 are preferably integrally formed. The waist hole 621 is for accommodating the cam structure 615. The outline of the cam structure 615 abuts against the outline of the waist hole 621. Rotation of the cam structure 615 can drive the waist hole 621 and the transfer portion 622 to move correspondingly. As the transfer portion 622 abuts against the first fork member 4, movement of the transfer portion 622 may drive the first fork member 4 to move correspondingly. In this embodiment, the transfer portion 622 includes a pair of fork shaped arm structures. The first fork member 4 has at least one lug 46. The lug 46 is located in the middle of the pair of fork shaped arms. When the lug 46 is in the first position or the second position, the lug 46 and the transfer portion 622 have a gap there between. This is because operation of the first fork member 4 in the first position or the second position will produce high-speed vibration, in order to avoid that the high-speed vibration reactively interferes the transfer portion 622 through the lug 46. When an adjusting operation is performed, the fork shaped arms of the transfer portion 622 will be driven by the cam structure 615 to move, so as to eliminate the gap between the lug 46 and the transfer portion 622. In this way, the transfer portion 622 comes into contact with the lug 46. With further movement of the transfer portion 622, the lug 46 and the first fork member 4 will be driven to move correspondingly. In the present invention, the lug 46 is disposed on the intermediate arms 45 of the first fork member 4, and protrudes outwardly relative to the intermediate arms 45. A distance from the lug 46 to the rotation shaft 43 is less than that from the first mating portion 41 to the rotation shaft 43. In other words, the lug 46 is located between the rotation shaft 43 and the first mating portion 41. Further, the lug 46 is located between the rotation shaft 43 and the first V-shaped structure 53.

In order to make the operating unit 61 rapidly and accurately drive the first fork member 4 to move to the first position or the second position, the adjusting mechanism 6 further includes a limit unit 63 for limiting the operating unit 61. The limit unit 63 includes a second elastic member 631 that abuts against the operating member 611, a limit member 632 that connects the operating member 611 through the second elastic member 631 and a limit slot 633 for accommodating the limit member 632 to rotate. One end of the second elastic member 631 abuts against the operating member 611, and the other end abuts against the limit member 632. The limit member 632 can be accommodated in the limit slot 633 to rotate. The limit slot 633 is substantially a slot designed in a curved shape, two ends of the curved slot are respectively provided with limit projections 634 that radially project outwardly relative to the limit slot 633, and the limit projections 634 respectively correspond to the first position and the second position. Meanwhile, the limit member 632 is further provided with a limit block 635 projecting outwardly, and the limit block 635 is biased outwardly under the biasing effect of the second elastic member 631. The limit member 632 is operable to rotate and move in the limit slot 633, and the limit block 635 is biased to contact a sidewall of the limit slot 633. When rotating to one limit projection 634, the limit block 635 is moved into the limit projection 634, so as to form stable clamping. At this point, the first fork member 4 just moves to the first position. When it is necessary to move the first fork member 4, the user overcomes the biasing force of the second elastic member 631 to press the limit member 632, so as to make the limit block 635 detached from the limit projection 634. Then, the limit member 632 can slide in the limit slot 633 without resistance. Until sliding to the other limit projection 634, the limit block 635 is clamped to the corresponding limit projection 635 to achieve locking. At this point, the first fork member 4 moves to the second position. For clear display, the position of the corresponding limit projection 634 of the housing 2 may also be provided with an indication structure, to facilitate the user to understand the current operating mode of the oscillating power tool 1. The indication structure may be arrows, illustrations and so on. In addition, the limit slot 633 is preferably disposed on an cover 636. The cover 636 is fixed onto the housing 2 through a screw. The cover 636 is further provided thereon with a third perforation 637, and the third perforation 637 accommodates passing of the part of the cam member 612, so that the second shape 614 of the cam member 612 and the cam structure 615 are located on two sides of the cover 636 respectively.

An operating method thereof is introduced below in detail. Suppose that an initial position of the oscillating power tool 1 is the first position as shown in FIG. 4. At this point, the first matching surface 411 of the first mating portion 41 of the first fork member 4 abuts against the first drive member 331, the fourth matching surface 422 opposite the first matching surface 411 abuts against the fork 34 of the second fork member 32, and at this point, the second matching surface 412 and the third matching surface 413 are in a free state. After the oscillating power tool 1 is started, through the transmission effect of the motor 23 and the eccentric transmission mechanism 3, the output shaft 26 of the oscillating power tool 1 outputs oscillating movement at a greater oscillating angle. When the user needs to output a smaller oscillating angle according to actual working conditions, the user operates the adjusting mechanism 6, and rotates the operating member 611, so that the transfer unit 62 is rotated through the cam structure 615 and the waist hole 621. In this way, the gap between the transfer portion 622 of the transfer unit 62 and the lug 46 of the first fork member 4 is eliminated until the transfer portion 622 abuts against the lug 46 and drives the first fork member 4 to rotate. Rotation of the first fork member 4 makes change matching relationships of the first mating portion 41 and the second matching portion 42. Specifically, the second matching surface 412 abuts against the second drive member 332, the third matching surface 421 abuts against the fork 34, and at this point, the first matching surface 411 and the fourth matching surface 422 are in a free state. In this way, after the oscillating power tool 1 is started, the output shaft 26 correspondingly outputs oscillating movement at a smaller oscillating angle. If the user needs a greater oscillating angle, it is feasible that the adjusting mechanism 6 is operated reversely to make the second fork member 32 go back to the initial position. In this way, the oscillating angle of the oscillating power tool 1 can be regulated back and forth.

Embodiment 2

Figure 14:
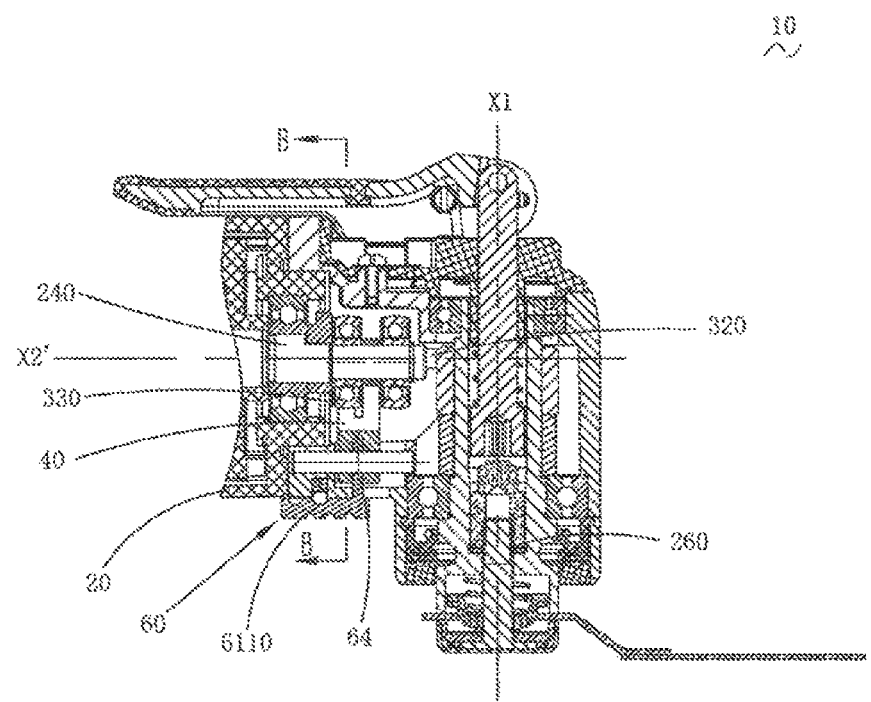
FIG. 14 is a view of the internal structure of the oscillating power tool in the second embodiment of the present invention.
Figure 15:
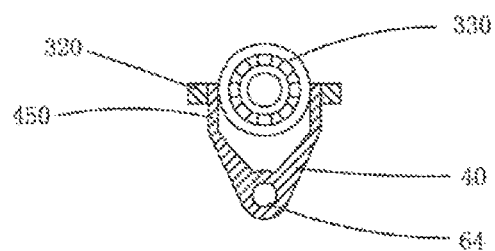
FIG. 15 is a sectional view taken along line B-B of the second fork as shown in FIG. 14.

As shown in FIG. 14 to FIG. 15, an oscillating power tool 10 in another embodiment. The parts similar to those in Embodiment 1 are no longer described, and their differences are mainly introduced below. In this embodiment, the first fork member 40 respectively mates with the drive member 330 and the second fork member 320 in a linear movement manner, so as to make the output shaft 260 to output a first oscillating angle in the first position and the output shaft 260 output a second oscillating angle in the second position. Particularly, the first fork member 40 linearly moves along the direction of the axis X2' of the drive shaft 240. The adjusting mechanism 60 includes an operating member 6110 disposed in the housing 20 and a connecting member 64 fixedly connecting the operating member 6110 and the first fork member 40. The operating member 6110 in this embodiment is a linearly moving push button. Preferably, its movement direction is also along the direction of the axis X2' of the drive shaft 240. Therefore, the operating member 6110 is linearly operated, and then through direct linkage of the connecting member 64, the first fork member 40 can be driven to move. In this embodiment, the connecting member 64 is a pin shaft, one end thereof is fixedly coupled with the first fork member 40, and the other end is fixedly connected with the push button. An end portion of the first fork member 40 connects the connecting member 64, and inner and outer sides of the intermediate arms 450 extending on two ends respectively abut against the drive member 330 and the second fork member 320.

Embodiment 3

Figure 16:
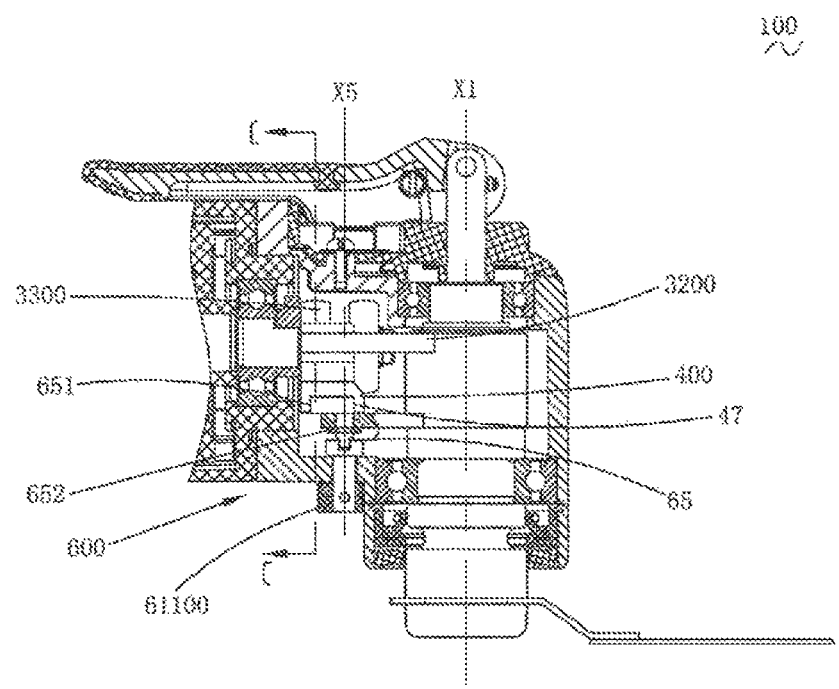
FIG. 16 is a view of the internal structure of the oscillating power tool in the third embodiment of the present invention.
Figure 17:
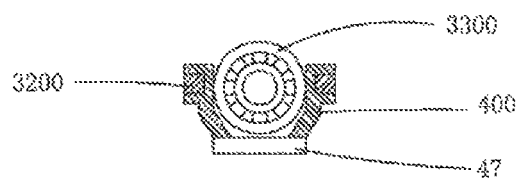
FIG. 17 is a sectional view taken along line C-C of the second fork as shown in FIG. 16.
Figure 18:
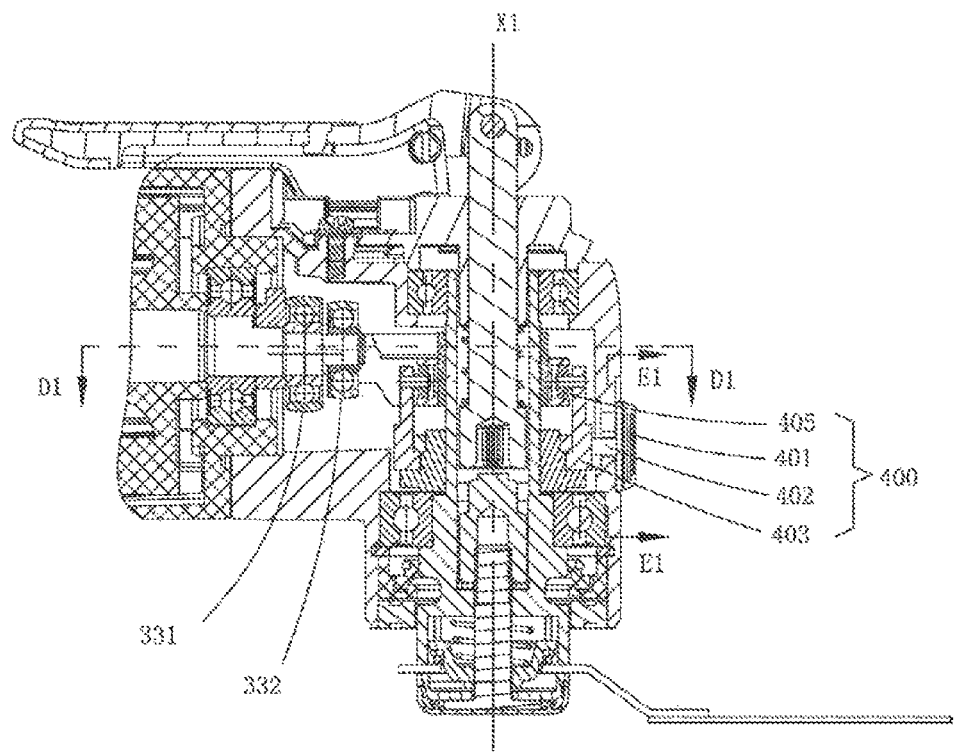
FIG. 18 is a schematic view of the oscillating power tool in the fourth embodiment of the present invention, where the fork assembly is located at the first position.
Figure 19:
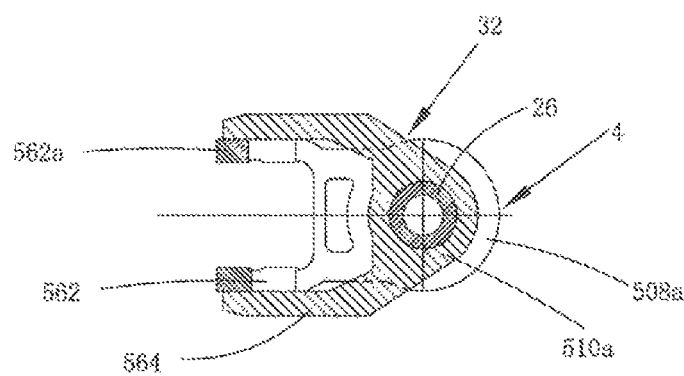
FIG. 19 is a sectional view taken along line D1-D1 as shown in FIG. 18.
Figure 20:
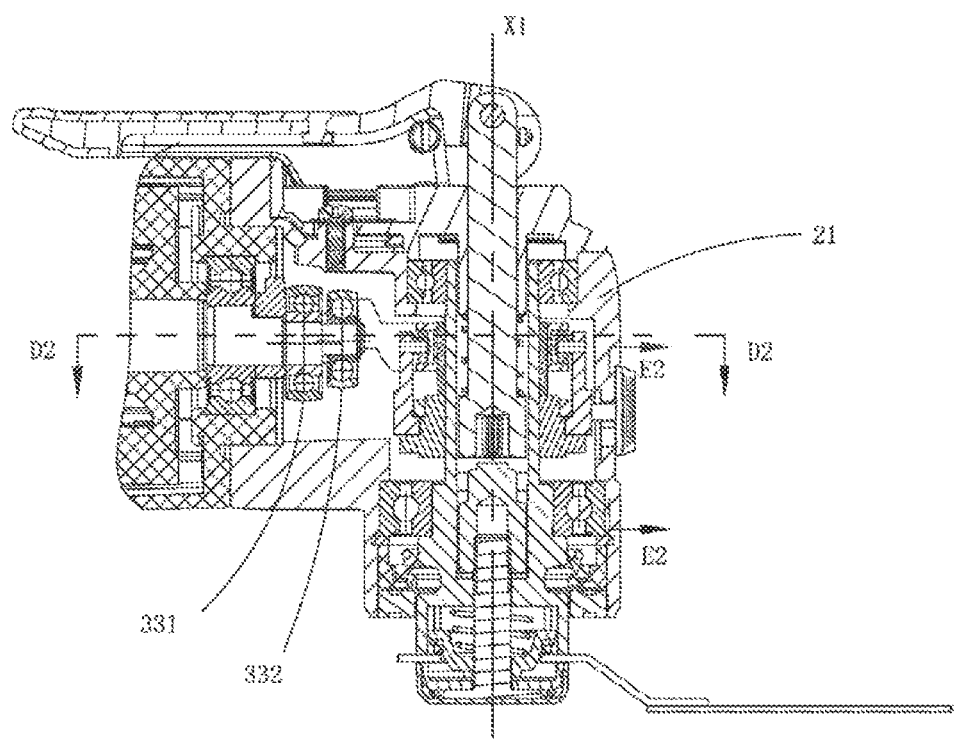
FIG. 20 is a schematic view of the oscillating power tool as shown in FIG. 18, where the fork assembly is located at the second position.
Figure 21:
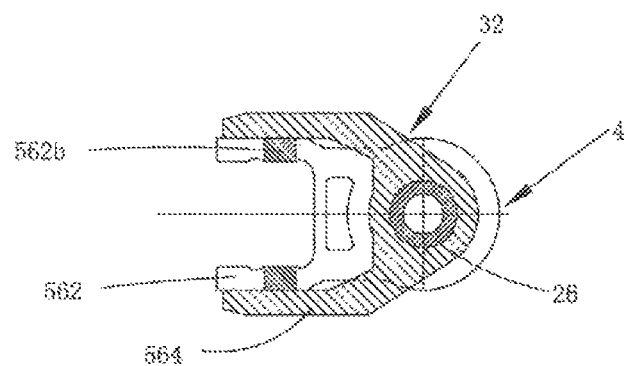
FIG. 21 is a sectional view taken along line D2-D2 as shown in FIG. 20.

As shown in FIG. 16 to FIG. 17, an oscillating power tool 100 in another embodiment. It is quite similar to the oscillating power tool 100 in the specific embodiment 2, and the difference is that the operating member 61100 of the adjusting mechanism 600 does not operably move linearly, but operably rotates about an operation axis X5, so as to drive the first fork member 400 to move. The operation axis X5 is disposed in parallel to the axis X1 of the output shaft, and keeps at a distance. The connecting element 65 of the adjusting mechanism 600 in this embodiment includes a cam portion 651 and a connecting portion 652. The connecting portion 652 is fixedly coupled with the center of the cam portion 651. The center of the cam portion 651 penetrates through the operation axis X5. The connecting member 652 is fixedly coupled with the operating member 61100. The outline of the cam portion 651 abuts against a sidewall of a receiving cavity 47 on the first fork member 400. The operating member 61100 is a rotary knob rotatably operated in this embodiment. The rotating operation of the operating member 61100 is converted to linear movement of the first fork member 400 through a connecting element.

Embodiment 4

Referring to FIG. 18 to FIG. 21, in the embodiment, the fork assembly includes a first fork member 4 and a second fork member 32 disposed separately, wherein a second sleeve 510a of the second fork member 32 close-fits the output shaft 26, a first sleeve 508a of the first fork member 4 is movably sleeved to an outer side of the second sleeve 510a, and the first fork member 4 is movable along the direction of the axis X1 of the output shaft relative to the output shaft 26. A pair of first fork shaped arms 562 of the first fork member 4 and a pair of second fork shaped arms 564 of the second fork member 32 are disposed in parallel respectively, wherein the first fork shaped arms 562 are located on inner sides of the second fork shaped arms 564, and opposite inner side surfaces of the first fork shaped arms 562 are respectively provided with matching portions for matching with first and second drive members 331 and 332.

When the second fork member 32 moves to the first position relative to the first fork member 4 along the axis X1 of the output shaft, the first matching portion 562a matches the first drive member 331, at this point, outer sides of the first fork shaped arms 562 sticks adjacent to inner sides of the second fork shaped arms 564, in this way, oscillating of the first fork member 4 is transferred to the second fork member 32 by the first and second fork shaped arms, to cause the output shaft 26 close-fitting the second sleeve 510a of the second fork member 32 to produce rotary oscillating movement, and at this point, the output shaft 26 is pivoted back and forth at a first oscillating angle. When the second fork member 32 moves to the second position along the axis X1 of the output shaft, at this point, the second matching portion 562b matches the second drive member 332, and the output shaft 26 is pivoted back and forth at a second oscillating angle. The separate setting of the fork assembly eliminates the gap between the output shaft 26 and the second sleeve 510a of the second fork member 32, to cause the oscillating angle of the output shaft 26 to be more precise.

The adjusting mechanism 400 disposed on the head shell 21 operably drives the first fork member 4 to move along the axis X1 of the output shaft relative to the output shaft 26. The adjusting mechanism 400 includes a control member 401 that can be operated manually, a pin 402 passing through the head shell 21 and connecting the control member 401, a transmission rod 403 fixedly connected with the pin 402 and extending longitudinally along the head shell 21, and a pulley 405 fixedly connected with one end of the transmission rod 403, and the pulley 405 is engaged into a recess (not shown) of a peripheral wall of the first sleeve 508a extending along the axis X1 of the output shaft.

Figure 22:
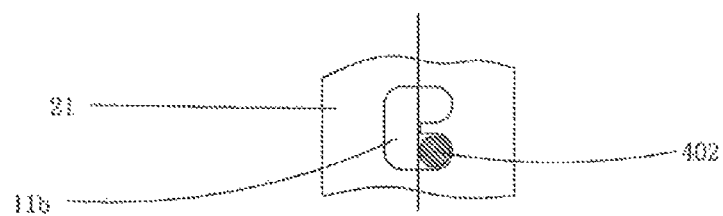
FIG. 22 is a sectional view taken along line E1-E1 as shown in FIG. 18.
Figure 23:
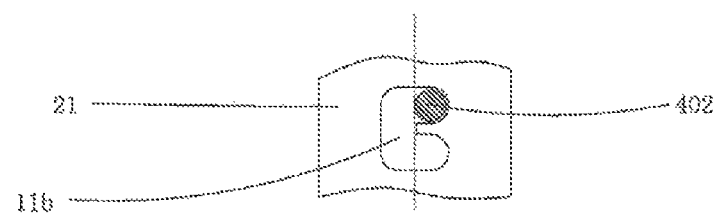
FIG. 23 is a sectional view taken along line E2-E2 as shown in FIG. 20.

Further referring to FIG. 22 and FIG. 23, the head shell 21 is provided thereon with a horizontal U-shaped opening 11b, the pin 402 moves up and down in the opening 11b along a direction parallel to the axis X1 of the output shaft under the operation of the control member 401, and can be clamped and positioned with the head shell 21 on two end portions of the opening 11b. When it is necessary to make readjustment, delocking is necessary at first, that is, clamping and positioning between the pint 402 and the opening 11b is released, and the pin 402 is shifted towards the middle part of the U shape. In the process that the control member 401 controls the pulley 405 to move up and down, the pulley 405 drives the first sleeve 508a to move up and down and drive the first fork member 4 to move up and down, so as to match different bearings and change the oscillating angle of the output shaft 26.

Embodiment 5

Figure 24:
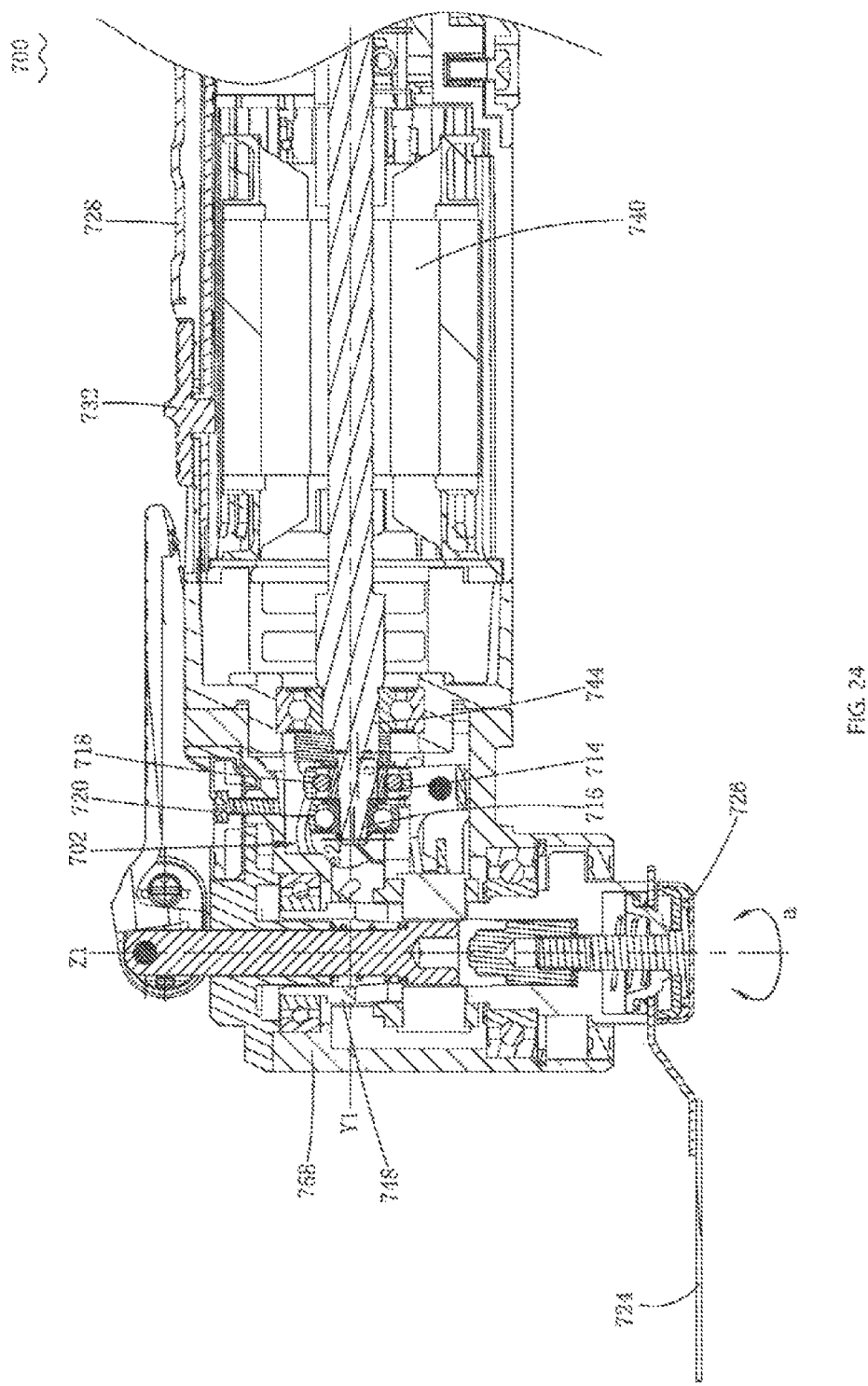
FIG. 24 is a schematic view of the oscillating power tool in the fifth embodiment of the present invention.

Referring to FIG. 24, a multi-function machine is specifically an oscillating power tool 700, a housing thereof includes a longitudinally extending case 728, and a head shell 758 extending from the case 728 to one side, the case 728 is internally provided with a motor 740, the motor 740 extends to form a drive shaft 744 that makes rotary movement, the drive shaft 744 has an axis Y1, and the case 728 is provided thereon with a switch 732 that controls turn-on or turn-off of the motor 740. The output shaft 748 is disposed at the head shell 758 along a vertical direction, the output shaft 748 has an axis Z1 of the output shaft substantially perpendicular to the axis Y1 of the drive shaft, the output shaft 748 can make oscillating movement about its own axis Z1, and the oscillating direction is as shown by the double-headed arrow a in FIG. 24.

Inside the case 728 is an eccentric transmission mechanism located between the drive shaft 744 and the output shaft 748, and a rotary movement of the drive shaft is converted to an oscillating movement of the output shaft through the eccentric transmission mechanism. The eccentric transmission mechanism includes an eccentric device and a fork assembly 702 connected between the eccentric device and the output shaft 748. In this embodiment, the eccentric device includes a first eccentric shaft 714 and a second eccentric shaft 716 connected to the drive shaft 744 in sequence, a first drive member 718 disposed at the first eccentric shaft 714 and a second drive member 720 disposed at the second eccentric shaft 716. The first eccentric shaft 714 is offset to one side of the axis Y1 of the drive shaft, the second eccentric shaft 716 is offset to the same side of the axis Y1 of the drive shaft, and axes of the first eccentric shaft 714 and the second eccentric shaft 716 are respectively parallel to the axis Y1 of the drive shaft. The first drive member 718 and the second drive member 720 are disposed in parallel along a direction perpendicular to the axis Y1 of the drive shaft. Those skilled in the art can also conceive of setting the first drive member 718 and the second drive member 720 in the eccentric device as eccentric drive members, mounted to the drive shaft or drive shafts disposed eccentrically.

Figure 25:
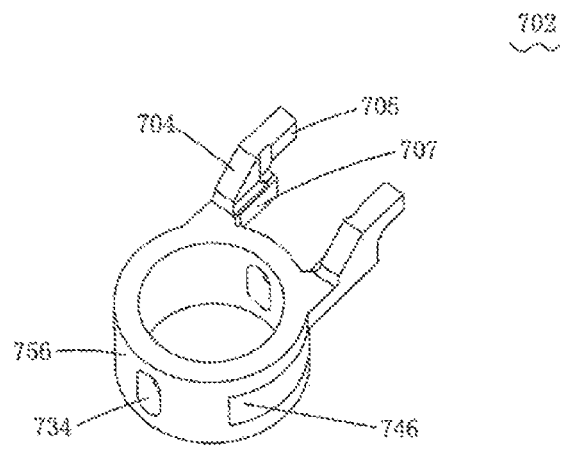
FIG. 25 is a perspective view of the fork assembly of the oscillating power tool as shown in FIG. 24.

In combination with FIG. 24 and FIG. 25, on one end of the fork assembly 702, an output portion is connected with the output shaft 748, and on the other end, an input portion optionally matches one of the first drive member 718 and the second drive member 720; through the eccentric transmission mechanism, the rotary movement of the drive shaft 744 can be converted to an oscillating movement of the output shaft 748. When the first drive member 718 and the second drive member 720 rotate under the driving of the drive shaft 744, through cooperation between one of the first drive member 718 and the second drive member 720 and the fork assembly 702, the output shaft 748 is driven to make oscillating movement about its own axis Z1. Definitely, the first eccentric shaft 714 and the second eccentric shaft 716 in this embodiment may also be designed into one, that is, the first drive member 718 and the second drive member 720 are mounted to the same eccentric shaft.

An eccentric distance e1 between the first eccentric shaft 714 and the axis Y1 of the drive shaft is greater than an eccentric distance e2 between the second eccentric shaft 716 and the axis Y1 of the drive shaft, and the eccentric distance e1 substantially ranges from 1 mm to 1.5 mm, which is preferably 1.3 mm in this embodiment; the eccentric distance e2 substantially ranges from 0.4 mm to 0.8 mm, which is preferably 0.7 mm in this embodiment. Definitely, those skilled in the art can conceive of that the eccentric distances e1 and e2 may also be set as the same value. The parallel setting used by the first and second drive members 718 and 720 in this embodiment is spherical ball bearings, each of which has an outer ring and an inner ring, wherein the outer ring has a spherical outer surface, and the inner rings are used for sheathed on the eccentric shafts 714 and 716 respectively. The first and second drive members 718 and 720 may also be replaced with other bearings that allow inner rings and outer rings of the bearings to oscillating at a small angle such as self-aligning ball bearings and double-row angular contact ball bearings with double inner rings according to the form of the fork. The radial dimension of the first drive member 718 in this embodiment is greater than that of the second drive member 720, and certainly, the first drive member 718 may also be set to have the same size as the second drive member 720. When the fork assembly 702 matches the first drive member 718, the oscillating angle of the output shaft 748 is between about 2.2 degrees to 2.8 degrees, and the oscillating frequency range may be set as about 5000 times to 30000 times per minute; the oscillating angle is preferably 2.5 degrees, and the oscillating frequency is preferably 18000 times per minute. When the fork assembly 702 matches the second drive member 720, the oscillating angle of the output shaft 748 is between about 1.2 degrees to 1.8 degrees, and the oscillating frequency range may be set as about 10000 times to 30000 times per minute; the oscillating angle is preferably 1.5 degrees, and the oscillating frequency is preferably 18000 times per minute.

It is possible to install the work head 724 through a fixed member 726 at the end of the output shaft 748, in this embodiment, the work head 724 is a straight blade, and the work head, under the driving of the output shaft 748, can make oscillating movement along the direction of the double-headed arrow a in FIG. 24. The fork assembly 702 may move between the first position where it matches the first drive member 718 and the second position where it matches the second drive member 720, thus making the output shaft 748 output different oscillating angles and driving the work head 724 to make oscillating movement at different oscillating angles, to achieve different cutting efficiencies.

Figure 26:
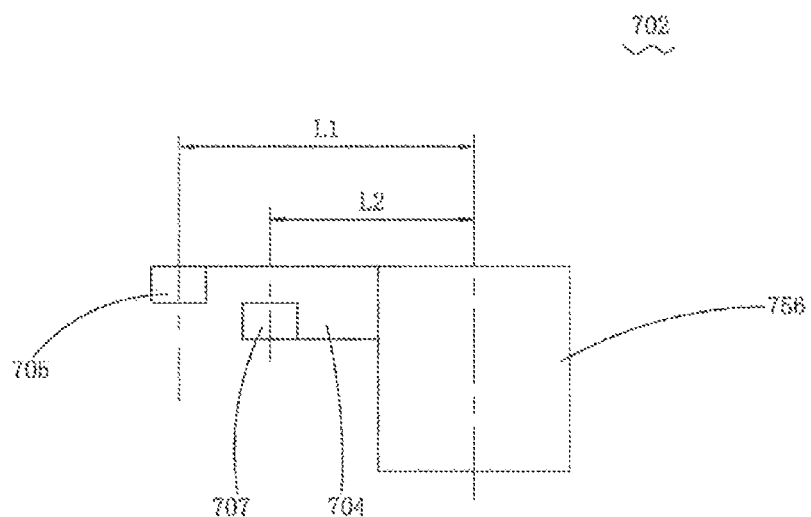
FIG. 26 is a simplified view of the fork assembly as shown in FIG. 25.

Referring to FIG. 25 and FIG. 26, the output portion of the fork assembly 702 is set as a sleeve 756 sheathed on the output shaft 748, the input portion is set as a fork shaped arm 704 horizontally extending from the sleeve 756 towards the drive shaft 744, the fork shaped arm 704 is substantially U-shaped, and the sleeve 756 is sheathed on the output shaft 748. Two opposite inner side surfaces of the fork shaped arm 704 respectively directly face the first matching portion 705 and the second matching portion 707 (FIG. 25 merely illustrates an inner side surface of one fork shaped arm). The first matching portion 705 and the second matching portion 707 are located at different parts along the extending direction of the fork shaped arm 704, but planes where the first matching portion 705 and the second matching portion 707 located are parallel, the first matching portion 705 and the second matching portion 707 are staggered in positions perpendicular to the extending direction, the first matching portion 705 is away from the sleeve 756, and the second matching portion 707 is adjacent to the sleeve 756. A distance L1 between the centerline of the first matching portion 705 and the centerline of the sleeve 756 is greater than a distance L2 between the centerline of the second matching portion 707 and the centerline of the sleeve 756, a distance between two first matching portions 705 disposed oppositely is greater than that between two second matching portions 707 disposed oppositely, such a setting causes the first matching portion 705 to be suitable for covering two sides of the outer ring of the first drive member 718, and they closely rolls and contacts; the second matching portion 707 is suitable for covering two sides of the outer ring of the second drive member 720, and they closely rolls and contacts.

Figure 27:
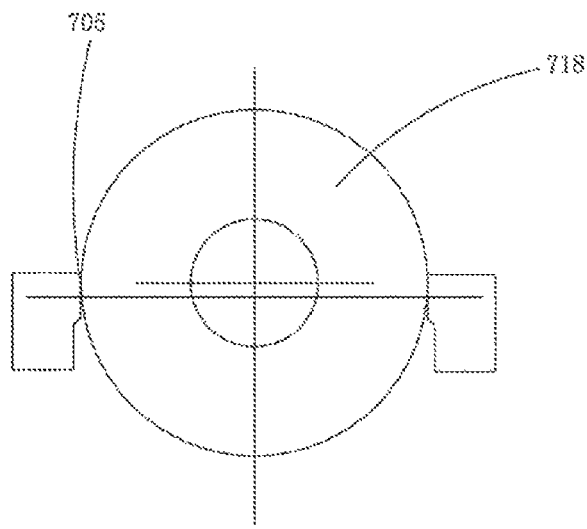
FIG. 27 is a schematic view of the fork assembly located at the first position as shown in FIG. 25, where the fork assembly matches the first drive member.
Figure 28:
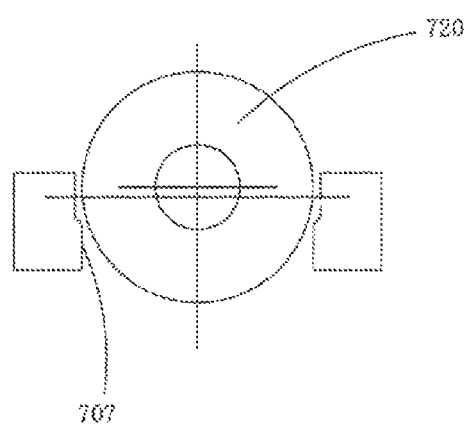
FIG. 28 is a schematic view of the fork assembly located at the first position as shown in FIG. 25, where the fork assembly is detached from the second drive member.

Referring to FIG. 24, FIG. 27 and FIG. 28, when the fork assembly 702 moves to the first position, the first matching portion 705 matches the first drive member 718, at this point, the switch 732 is turned off, the drive shaft 744 of the motor 740 begins to rotate, to drive the first eccentric shaft 714 and the first drive member 718 to eccentrically rotate about the axis Y1, and through cooperation among the fork shaped arm 704, the first matching portion 705 and the first drive member 718, the output shaft 748 is driven to oscillate about its own axis Z1 at a first angle; at this point, the second matching portion 707 is in a state of being detached from the second drive member 720.

Figure 29:
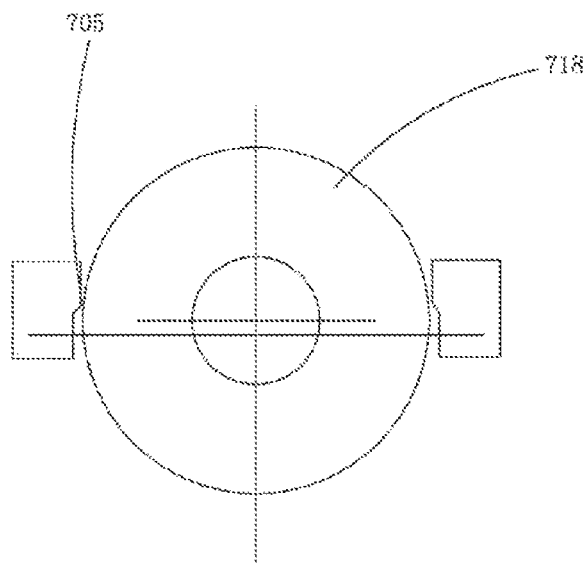
FIG. 29 is a schematic view of the fork assembly located at the second position as shown in FIG. 25, where the fork assembly is detached from the first drive member.
Figure 30:
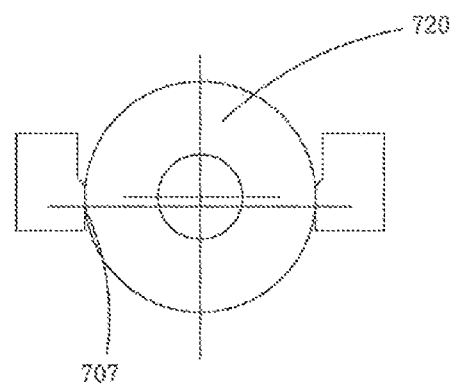
FIG. 30 is a schematic view of the fork assembly located at the second position as shown in FIG. 25, where the fork assembly matches the second drive member.

Referring to FIG. 24, FIG. 29 and FIG. 30, when the fork assembly 702 moves to the second position, the first matching portion 705 is detached from the first drive member 718 and the second matching portion 707 matches the second drive member 720, at this point, the switch 732 is turned off, the drive shaft 744 of the motor 740 begins to rotate, to drive the second eccentric shat 716 connected to the first eccentric shaft 714 and the second drive member 720 to eccentrically rotate about the axis Y1, and through cooperation among the fork shaped arm 704, the second matching portion 707 and the outer ring of the second drive member 720, the output shaft 748 is driven to oscillate about its own axis Z1 at a second angle.

In this embodiment, the sleeve 756 of the fork assembly 702 movably matches relative to the output shaft 748, and preferably, the sleeve 756 is movably sheathed along the output shaft 748 along the axis of the output shaft 748 so as to drive the fork assembly to move between the first position and the second position, thus making the output shaft 748 oscillating about its own axis at a first angle or a second angle.

Figure 31:
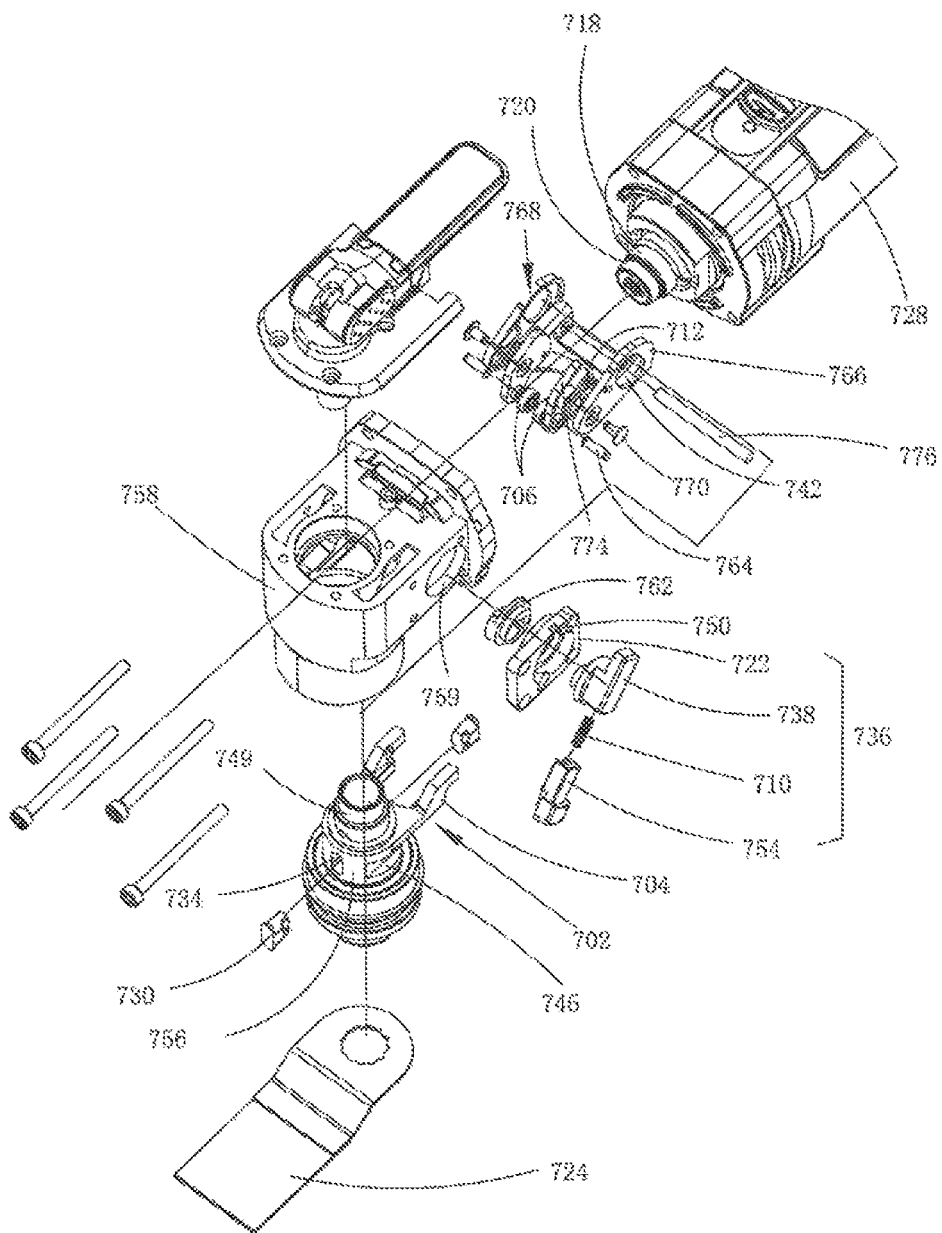
FIG. 31 is a partially exploded view of the oscillating power tool as shown in FIG. 24.
Figure 32:
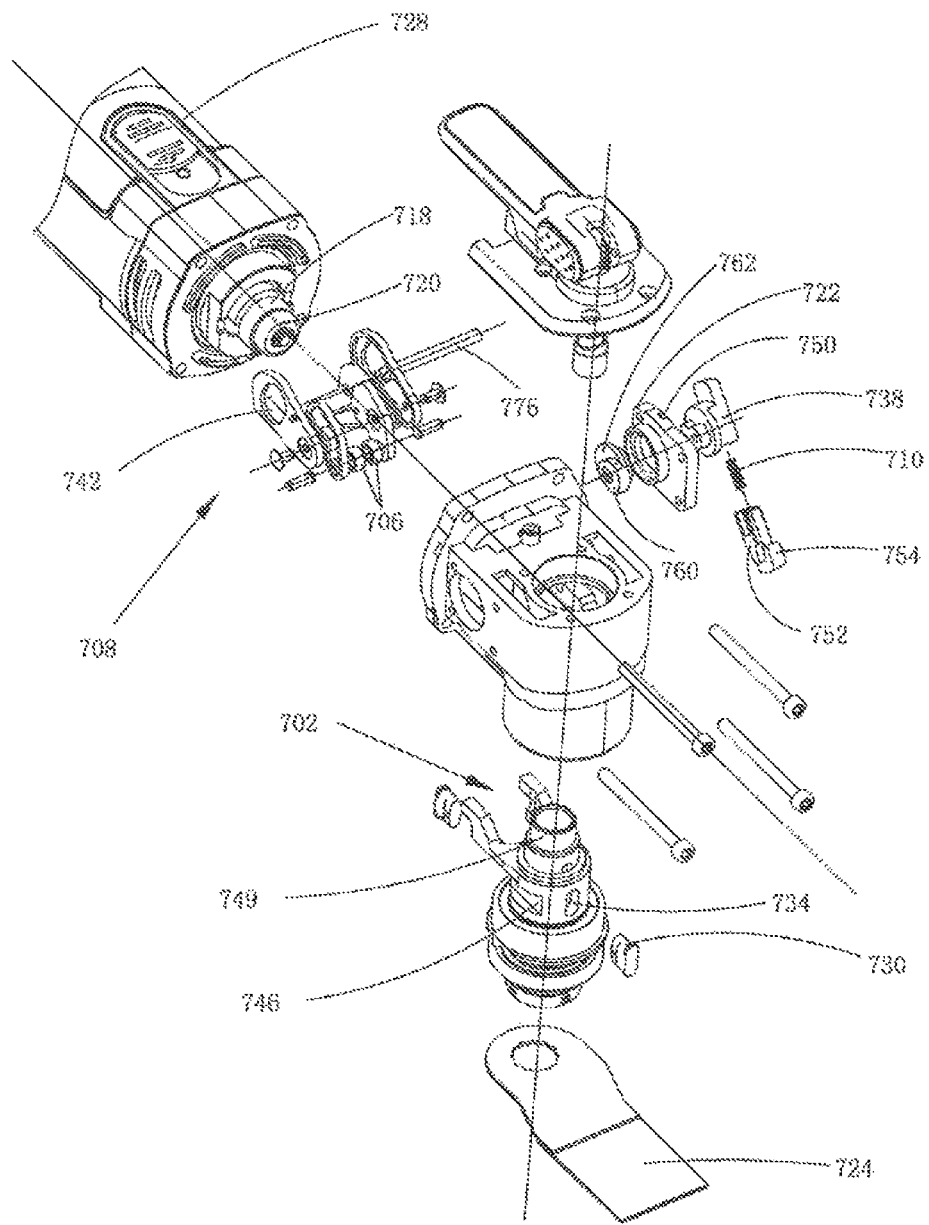
FIG. 32 is a partially exploded view of the oscillating power tool as shown in FIG. 31.
Figure 33:
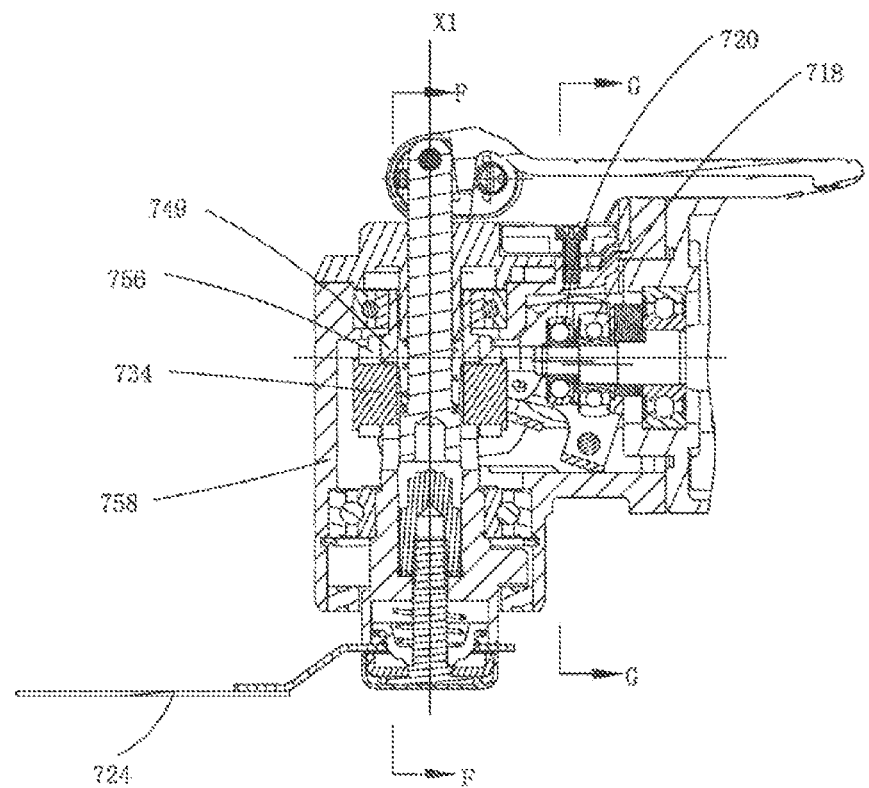
FIG. 33 is a sectional view of the oscillating power tool as shown in FIG. 31.
Figure 34:
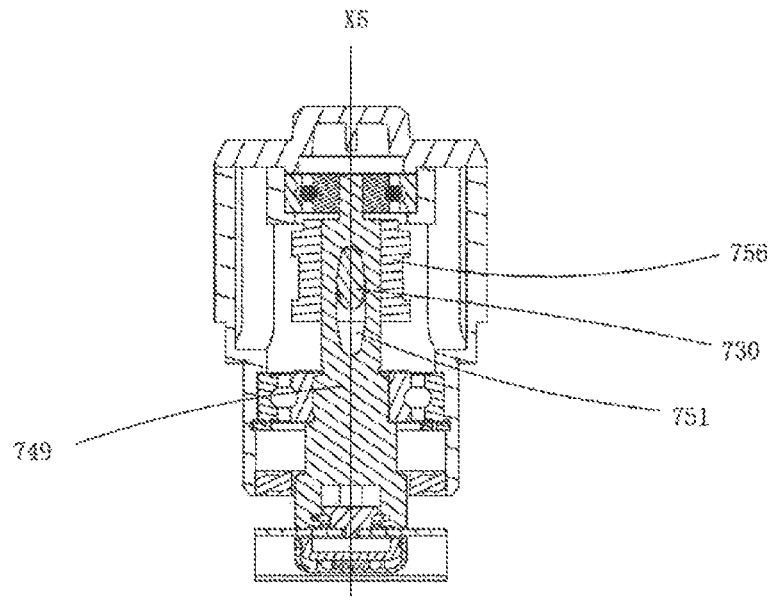
FIG. 34 is a sectional view taken along line F-F as shown in FIG. 33, the fork assembly is located at the first position.
Figure 35:
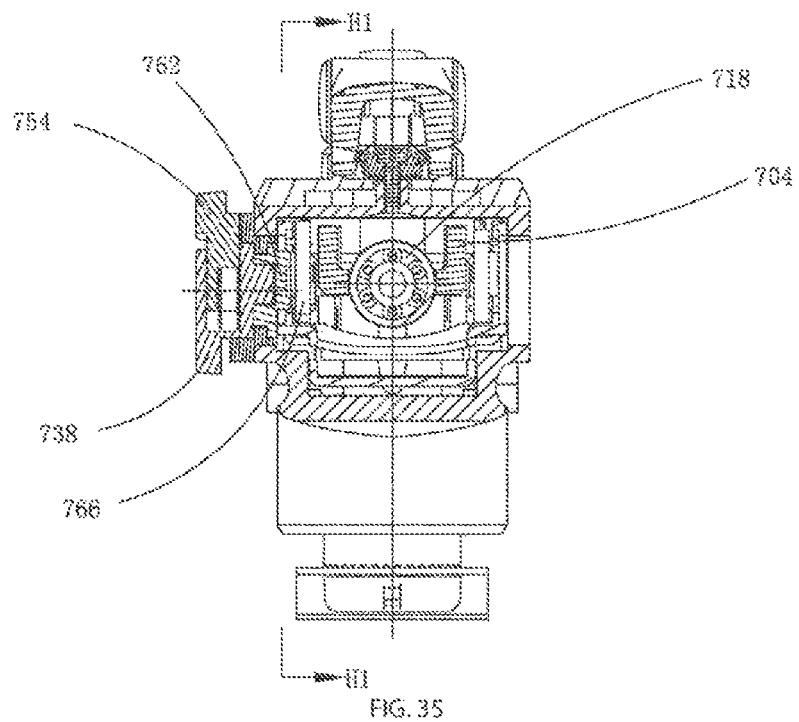
FIG. 35 is a sectional view taken along line G-G as shown in FIG. 33, the fork assembly is located at the first position.
Figure 36:
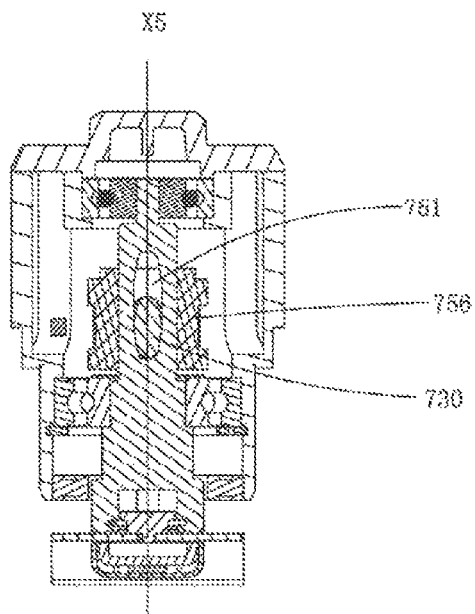
FIG. 36 is a sectional view taken along line F-F as shown in FIG. 33, the fork assembly is located at the second position.
Figure 37:
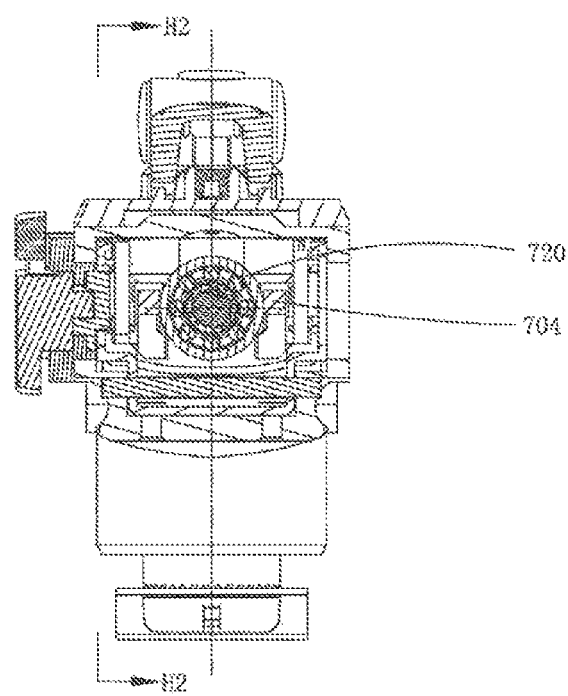
FIG. 37 is a sectional view taken along line G-G as shown in FIG. 33, the fork assembly is located at the second position.
Figure 38:
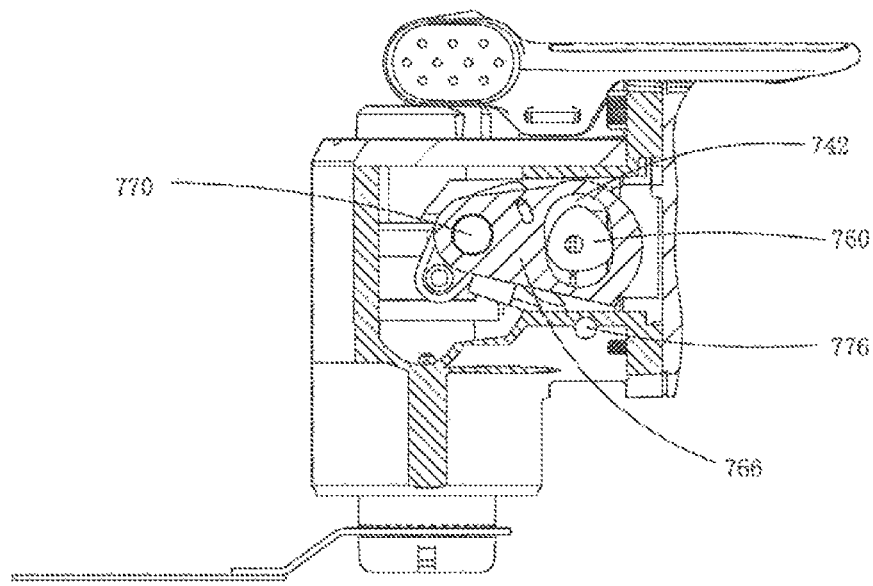
FIG. 38 is a sectional view taken along line H1-H1 as shown in FIG. 35, the fork assembly is located at the first position.
Figure 39:
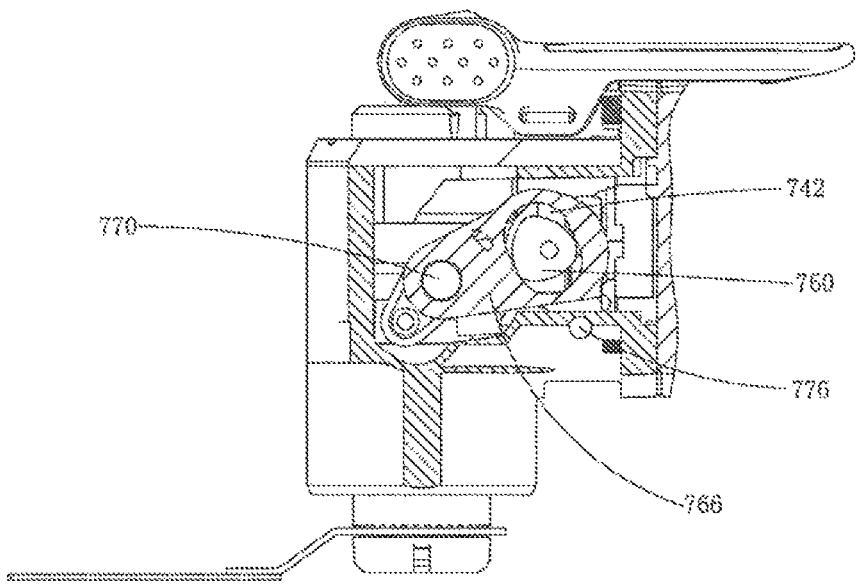
FIG. 39 is a sectional view taken along line H2-H2 as shown in FIG. 37, the fork assembly is located at the second position.

Specifically, referring to FIG. 30 and FIG. 31, enclosure walls of the sleeve 756 are symmetrically provided with openings 734, a pair of key teeth 730 are respectively used for close-fitting the openings 734 and extending into the notch of the output shaft 748 (not shown), and matching of the fork assembly 702 with the notch of the output shaft 748 through the key teeth 730 enables the fork assembly 702 to have orientation when moving relative to the output shaft 748. In addition, positions on the sleeve 756 perpendicular to a pair of openings 734 are correspondingly provided with a pair of receiving slots 746 (only one is shown) circumferentially extending along the sleeve 756.

One side of the head shell 758 is provided with a hole 759, used for controlling and adjusting the control member 736 of the fork assembly 702 to be disposed corresponding to the hole 759, the control member 736 includes a control knob 738 rotatably disposed outside the head shell 758, a lock knob 754 elastically disposed at the control knob 738, a spring 710 disposed between the lock knob 754 and the control knob 738, a cam member 762 fixedly connected with the control knob 738, and an cover 722 disposed between the control knob 738 and the cam member 762. The cover 722 is connected with the head shell 758 through a fastener, the center of the cover 722 is provided with a hole directly facing the hole 759 of the head shell, and the cam member 762 is connected together with an end portion of the control knob 738 passing through the hole of the cover 722 and the hole 759 of the head shell and can rotate along with the control knob 738. The cam member 762 is provided with an irregular cam portion 760, one side of the cover 722 towards the control knob 738 is provided with several lock slots 750, one side on the lock knob 754 towards the cover 722 is provided with a lock key 752, under normal conditions, the lock knob 754 is in a first state under the force of the spring 710, and at this point, the lock key 752 and one of the several lock slots 750 are in an engaged lock position, and the control knob 738 is in a lock state and cannot rotate relative to the head shell 758. The force of the spring 710 is overcome to push the lock knob 754 to move to a second state, at this point, the spring 710 is compressed, the lock key 752 and the lock slot 750 are disengaged, and the control knob 738 can rotate after being unlocked. In this embodiment, there are two lock slots 750, that is, the lock key 752 rotates along with the control knob 738 and is optionally engaged and locked to the positions of two different lock slots 750.

The transmission device 708 is disposed in the head shell 758, used for transferring movement of the control member 736 to the fork assembly 702, and the transmission device 708 is symmetrically distributed along the axis of the drive shaft. The transmission device 708 includes a support frame 768 driven by the cam member 762 to rotate, a rotating member 744 matching with the support frame 768, and an elastic member 712 disposed between the support frame 768 and the rotating member. The support frame 768 has a pair of support arms 766 disposed oppositely, the support arms 766 extend along the direction of the fork shaped arm 704, the support arms 766 are provided thereon with engagement slots 742 engaged with and matching with the cam portion 760, the support frame 768 is provided thereon with a rotation shaft 776, and under the driving of the cam member 762, the support frame 768 can rotate about the rotation shaft 776. The support arms 766 are respectively fixed with support frames 770, and a pair of rotating members 774 are respectively fixedly connected to inner sides of the support arms 766 through the support frames 770; in this embodiment, elastic members 712 disposed between the rotating members 774 and the support arms 766 are torsion springs sheathed to the support frames 770, one end of the torsion springs are supported to inner sides of the support arms 766, and the other ends are supported on the rotating members 774; under the force of the torsion springs, the positions of the rotating members 774 and the support arms 766 are kept relatively fixed, to cause the support frames 768 to drive the support frames 770 to rotate along with the rotating members 774 when rotating. A pair of transmission bearings 706 is respectively fixedly connected to inner sides of the rotating members 774 through pines 764, and the rotating members 774 drive the bearings 706 to move correspondingly when rotating.

The transmission bearings 706 are respectively engaged with the receiving slots 746 on two sides of the sleeve 756, and the movement of the transmission bearings 706 will drive the fork assembly 702 to move up and down along an axial direction of the output shaft, to cause the fork arm 704 to move to the first position where it matches the first drive member 718 or move to the second position where it matches the second drive member 720, thus making the spindle 749 rotate and oscillating within different angle ranges. Owing to existence of the torsion springs, an up-and-down position movement range of the transmission bearings 706 is set to be greater than an up-and-down movement extreme position of the fork assembly 702, when the cam member 762 drives the support frame 768 to rotate, two ends of the torsion springs are compressed respectively, thereby producing a pre-tightening pressure, and the receiving slots of the fork assembly 702 will force the rotating members 774 and the support arms 766 to produce relative movement there between. The transmission device 708 is symmetrically distributed along the axis of the drive shaft, to cause the movement of the control member 736 to be transferred by the transmission device 708 and finally make the movement of the fork assembly 702 along the axial direction of the output shaft more stable; at the same time, an error of the oscillating angle of the output shaft 708 caused by manufacturing precision of the fork assembly 702 can be overcome, thus causing the control over the oscillating angle of the output shaft 708 more accurate.

Referring to FIG. 33 to FIG. 37, a gap elimination mechanism is disposed between the sleeve 756 and the output shaft 748, and the gap elimination mechanism is for reducing a circumferential oscillating gap of the output shaft 748. The gap elimination mechanism includes a notch 751 disposed at the output shaft 748 and extending along the axis of the output shaft, and key teeth 730 fixedly connecting the output portion, the key teeth 730 are symmetrically disposed on enclosure walls of the sleeve 756 and extend into the notch 751 of the output shaft 748, and when the fork assembly 702 moves to the first position where it matches the first drive member 718 along the axis Z1 of the output shaft, the key teeth 730 are engaged to the top of the notch 751. In this embodiment, the key teeth 730 have a section which is similar to an ellipse but is different from a complete ellipse, and have conical surfaces on two sides of upper and lower ends thereof, correspondingly, the notch 751 are respectively provided with conical surfaces matching with the key teeth 730 on upper and lower ends thereof, and with such a setting, when the fork assembly 702 matches the first drive member 718 or the second drive member 720, the gap between the sleeve 756 and the output shaft 748 is reduced, which can effectively reduces shake when the output shaft 748 rotates, so as to achieve precise control over the oscillating angle of the output shaft 748.

Referring to FIG. 35 to FIG. 39, the engagement slot 742 is substantially a waist slot, the cam portion 760 on the cam member 762 is engaged to the engagement slot 742, and the cam portion 760 is an irregular cam portion 760; by releasing lock of the lock knob 754 for the control knob 738, then the control knob 738 is rotated towards the first direction, to make the cam member 762 drive the support arm 766 to rotate about the rotation shaft 776 and drive the rotating member 774 to rotate about the support frame 770, thus causing the cam portion 760 to abut against and be locked with a slot surface of the engagement slot 742 when the fork assembly 702 is driven to move to the first position where it matches the first drive member 718. The control knob 738 is rotated towards the second direction, to make the cam member 762 drive the support arm 766 to reversely rotate about the rotation shaft 776 and drive the rotating member 774 to rotate about the support frame 770, thus causing the cam portion 760 to abut against and be locked with the slot surface of the engagement slot 742 again when the fork assembly 702 is driven to move to the second position where it matches the second drive member 720.

The eccentric devices of the embodiments of the present invention are not limited to the first and second drive members, and those skilled in the art may also dispose more than two drive members in parallel along the axis of the drive shaft; correspondingly, the eccentric shafts are not limited to the first and second eccentric shafts, and it is feasible to dispose more than two eccentric shafts used for matching different drive members in sequence; the fork may also be correspondingly provided with more than two matching portions used for alternatively matching with the corresponding drive members, the result of such a setting is that the fork moves to different matching positions along the axis of the output shaft, to cause the output shaft to have more than two different oscillating angles.

The relative relationship between the drive shaft and the output shaft according to the embodiments of the present invention is not limited to the parallel setting, which may also be set in another angle or manner. The embodiments of the present invention, by use of an adjusting mechanism, operably move the fork up and down to different positions along the axial direction of the output shaft, to cause the fork to cooperate with different drive members, thus making the output shaft output different oscillating angles, to meet working demands of different occasions; moreover, the structure is simple, and operations are convenient.

The present invention is not limited to the above embodiments, and those skilled in the art can also make other variations under the teachings of the technical essence of the present invention, which should be included in the protection scope of the present invention as long as the functions achieved are the same as or similar to those of the present invention.

The invention claimed is:

1. An oscillating power tool, comprising:
   a housing;
   a motor contained in the housing;
   a drive shaft driven by the motor to output a rotary movement;
   an output shaft contained in the housing, capable of oscillating about its own axis, and used for installing and driving work heads to work; and
   an eccentric transmission mechanism being configured to convert the rotary movement of the drive shaft to an oscillating movement of the output shaft, the eccentric transmission mechanism comprising:
   an eccentric device and a fork assembly, the eccentric device being mounted on the drive shaft and eccentrically rotating about the axis of the drive shaft, and the fork assembly connecting the output shaft and the eccentric device;
   the eccentric device comprising at least two drive members, the fork assembly comprises an input portion for mating with the eccentric device and an output portion for matching with the output shaft, the oscillating power tool further comprises an adjusting mechanism disposed in the housing, and the adjusting mechanism operably controls the input portion to move along an axial direction of the output shaft between at least two positions, the input portion mating with different drive members at the at least two positions, so that the output shaft performs in different oscillating angles.

2. The oscillating power tool according to claim 1, wherein the drive member comprises a first drive member and a second drive member, the input portion moves between a first position and a second position along the axial direction of the output shaft, in the first position, the input portion mates with the first drive member, causing the output shaft to perform in a first oscillating angle; and in the second position, the input portion mates with the second drive member, causing the output shaft to perform in a second oscillating angle.

3. The oscillating power tool according to claim 2, wherein the eccentric device comprises a first eccentric shaft and a second eccentric shaft connected with the drive shaft in sequence, the first drive member is connected to the first eccentric shaft, and the second drive member is connected to the second eccentric shaft.

4. The oscillating power tool according to claim 3, the first eccentric shaft and the second eccentric shaft are parallel to the drive shaft respectively, and the axis of the first eccentric shaft and the axis of the second eccentric shaft are located on the same side of the axis of the drive shaft.

5. The oscillating power tool according to claim 4, wherein an eccentric distance between the first eccentric shaft and the drive shaft is greater than that between the second eccentric shaft and the drive shaft.

6. The oscillating power tool according to claim 2, wherein the input portion and the output portion are fixedly disposed.

7. The oscillating power tool according to claim 6, wherein the input portion is disposed as a fork shaped arm, an inner side surface of the fork shaped arm is provided with a first matching portion for mating with the first drive member and a second matching portion for mating with the second drive member respectively, the first matching portion and the second matching portion are oppositely disposed and the output portion is disposed as a sleeve matching with the output shaft.

8. The oscillating power tool according to claim 7, wherein planes where the first matching portion and the second matching portion located are parallel to each other, the first matching portion is away from the output portion, and the second matching portion is adjacent to the output portion.

9. The oscillating power tool according to claim 8, wherein a distance from the center line of the first matching portion to the axis of the output shaft is greater than that from the center line of the second matching portion to the axis of the output shaft.

10. The oscillating power tool according to claim 6, wherein the output portion slidably matches the output shaft.

11. The oscillating power tool according to claim 10, wherein the adjusting mechanism comprises a control member movably connected to the housing, a transmission portion fixedly connected with the control member, and a drive portion movably matching with the transmission portion, and the drive portion is disposed at the output portion.

12. The oscillating power tool according to claim 11, the control member comprises a control knob rotatably disposed at a head shell and a lock knob for locking the control knob, the transmission portion comprises a cam member fixedly connected with the control member, a support arm driven by the cam member to rotate, a rotating member and a bearing, which are driven by the support arm to rotate, and the drive portion is a receiving slot disposed at the output portion and engaging with the bearing.

13. The oscillating power tool according to claim 12, wherein the adjusting mechanism further comprises a locking mechanism used for locking the fork assembly at the first position or the second position relative to the output shaft, and the locking mechanism comprises a cam portion disposed on one side of the cam member and an engage slot for engaging with the cam portion.

14. The oscillating power tool according to claim 10, wherein a gap elimination mechanism is disposed between the output portion and the output shaft, and the gap elimination mechanism is used for reducing a circumferential oscillating gap of the output shaft.

15. The oscillating power tool according to claim 14, wherein the gap elimination mechanism comprises a notch disposed at the output shaft and extending along the axis of the output shaft, and a key tooth fixedly connected with the output portion, the key tooth is engaged with the notch, the top end and the bottom end of the notch are respectively provided with a first conical surface, and the key tooth is provided with a second conical surface mating with the first conical surface.

16. An oscillating power tool, comprising:
a housing;
a motor contained in the housing;
a drive shaft driven by the motor to output a rotary movement;
an output shaft contained in the housing, capable of oscillating about its own axis, and used for installing and driving work heads to work; and
an eccentric transmission mechanism being configured to convert the rotary movement of the drive shaft to an oscillating movement of the output shaft, the eccentric transmission mechanism comprising:
an eccentric device and a fork assembly, the eccentric device being mounted on the drive shaft and eccentrically rotating about the axis of the drive shaft, and the fork assembly connecting the output shaft and the eccentric device;
the eccentric device comprising at least two drive members, the fork assembly comprises an input portion for mating with the eccentric device and an output portion for matching with the output shaft, the input portion and the output portion are connected to each other; the input portion mates with different drive members, thus the output shaft performs in different oscillating angles.

17. An oscillating power tool, comprising:
a housing;
a motor contained in the housing;
a drive shaft driven by the motor to output a rotary movement;
an output shaft contained in the housing, capable of oscillating about its own axis, and used for installing and driving work heads to work; and
an eccentric transmission mechanism being configured to convert the rotary movement of the drive shaft to an oscillating movement of the output shaft, the eccentric transmission mechanism comprising:
an eccentric device and a fork assembly, the eccentric device being mounted on the drive shaft and eccentrically rotating about the axis of the drive shaft, and the fork assembly connecting the output shaft and the eccentric device;
the eccentric device comprises at least two drive members, the fork assembly comprises an input portion for mating with the eccentric device and an output portion for matching with the output shaft, the input portion and the output portion are connected to each other, the input portion moves along an axial direction of the output shaft to mate with different drive members, thus the output shaft performs in different oscillating angles.

* * * * *